United States Patent
Matsuda et al.

(10) Patent No.: US 6,169,952 B1
(45) Date of Patent: Jan. 2, 2001

(54) SYSTEM FOR DETERMINING PASSABILITY OF VEHICLE

(75) Inventors: Shohei Matsuda; Makoto Otabe; Yuji Sakaki, all of Saitama (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/056,244

(22) Filed: Apr. 7, 1998

(30) Foreign Application Priority Data

| Apr. 8, 1997 | (JP) | 9-089661 |
| Apr. 9, 1997 | (JP) | 9-091169 |
| Apr. 9, 1997 | (JP) | 9-091170 |

(51) Int. Cl.$^7$ ................................................ G06F 165/00
(52) U.S. Cl. .......................... 701/72; 340/438; 340/905; 701/208
(58) Field of Search .................................. 701/1, 36, 41, 701/43, 48, 70, 72, 80, 93, 97, 200, 207, 208, 213; 340/425.5, 438, 440, 441, 466, 467, 470, 471, 905; 342/357.09, 357.1, 357.12, 357.13, 357.14, 357.17, 385, 386

(56) References Cited

U.S. PATENT DOCUMENTS

| 5,539,397 | 7/1996 | Asanauma et al. ................ 340/901 |
| 5,546,311 | 8/1996 | Sekine ................................ 701/208 |
| 5,661,650 | 8/1997 | Sekine et al. ....................... 701/82 |

FOREIGN PATENT DOCUMENTS

| 5-141979 | 6/1993 | (JP) . |
| 8-147598 | 6/1996 | (JP) . |

*Primary Examiner*—William A. Cuchlinski, Jr.
*Assistant Examiner*—Edward Pipala
(74) *Attorney, Agent, or Firm*—Carrier, Blackman & Associates, P.C.; Joseph P. Carrier; William D. Blackman

(57) ABSTRACT

A system for determining the passability of a vehicle through a section of road ahead of the vehicle is controlled based on coordinates of a plurality of nodes $N_N$ ($N_1$, $N_2$, $N_3$, $N_4$ ... ) constituting the road section ahead of a subject vehicle. The system calculates a passing-state determination amount $\theta_N/L_N$ for each of the nodes $N_N$, and based on the passing-state determination amount $\theta_N/L_N$, the system then determines whether the vehicle can positively or safely pass through the road section. The passing-state determination amount $\theta_N/L_N$ serves as an indicator which represents a degree of difficulty in the passage of the vehicle through the nodes $N_N$ and which is obtained, for example, by dividing an angle $\theta_N$ formed by a line segment connecting the adjacent nodes $N_N$ by a distance $L_N$ between the adjacent nodes $N_N$. Even if only one or two nodes $N_N$ exist on a curve, it is possible to accurately determine whether the vehicle can pass the curve by using the passing-state determination amount $\theta_N/L_N$.

10 Claims, 20 Drawing Sheets

SYSTEM FOR DETERMINING PASSABILITY OF VEHICLE

BACKGROUND OF THE INVENTION

1. Field of the Invention

The present invention relates to a system for determining the passability of a vehicle, which involves perceiving a shape of a road based on map data comprised of an aggregation of a plurality of nodes and determining whether the vehicle can pass through the nodes.

2. Description of the Related Art

Such a system for determining the passability of the vehicle is known from Japanese Patent Application Laid-open No. 5-141979, wherein a radius of curvature of a curve of a road is presumed by calculating a radius of an arc passing through three nodes, and a passable speed of the vehicle calculated based on the radius of curvature of this curve is compared with a passage-predicting speed of the vehicle calculated based on a current vehicle speed. If the passage-predicting speed is equal. to or lower than the passable speed, it is determined that the vehicle can pass through the curve.

In the above conventional system, if three nodes $N_1$, $N_2$ and $N_3$ exist on the same curve, as shown in FIG. 12A, a radius R of curvature of the curve can be correctly presumed. However, the above conventional system suffers from the following problem: If central one of the three nodes $N_1$, $N_2$ and $N_3$ exists on a curve and the nodes $N_1$ and $N_3$ in front and in rear of the central node are out of the curve, as shown in FIG. 12B, a radius R' of curvature of the curve presumed from the three nodes $N_1$, $N_2$ and $N_3$ is larger than an actual radius R of curvature of the curve and hence, the shape of the curve cannot be correctly perceived.

SUMMARY OF THE INVENTION

Accordingly, it is an object of the present invention to ensure that even when three or more nodes do not exist on the same curve, it can be correctly determined whether the vehicle can pass through the nodes.

To achieve the above object, according to the present invention, there is provided a system for determining the passability of a vehicle, comprising map information outputting means for outputting a map information as an aggregation of a plurality of nodes constituting a road section, subject-vehicle position detecting means for detecting a position of the subject vehicle on a map, curve section determining means for determining whether a node ahead of the subject vehicle position exists on a curve section, passing-state determination amount calculating means for calculating a passing-state determination amount of the node existing on the curve section as a value resulting from division of an amount of variation in azimuth angle of the vehicle by a distance of movement of the vehicle, and passability determining means for determining whether the vehicle can pass through the node existing on the curve section, based on the passing-state determination amount.

With the above arrangement, if it is determined whether the node ahead of the subject vehicle position exists on the curve section, the system determines whether the vehicle can pass through the node existing on the curve section. The need for determining whether the vehicle can pass through a node existing on a straight road section is thereby eliminated, resulting in few calculations being performed. In addition, the passing-state determination amount is calculated from dividing the amount of variation in azimuth angle of the vehicle by the distance of movement of the vehicle. The passing-state determination amount thus serves to accurately represent a degree of difficulty in the passage of the vehicle through the node. Even when only one or two nodes exist on a curve, it is possible to accurately determine whether the vehicle can pass through the curve.

In addition to the above feature, the amount of variation in azimuth angle of the vehicle is calculated as an angle formed by a line segment connecting the adjacent nodes and the distance of movement of the vehicle is calculated based on a distance between the adjacent nodes. The amount of variation in azimuth angle and the distance of movement can be easily and accurately calculated.

In addition to the above feature, the system further includes passable speed calculating means for calculating a passable speed enabling the vehicle to pass the node existing on a curved road section, based on the passing-state determination amount, and a preset lateral acceleration limit in order for the vehicle to pass through the node. The passing-state determination amount may be defined according to the following equation:

passable speed=(preset limit lateral acceleration/passing-state determination amount)$^{1/2}$ Thus, it is possible to accurately calculate a passable speed which does not exceed the preset lateral acceleration limit.

In addition to the above feature, the system further includes passable speed calculating means for calculating a passable speed enabling the vehicle to pass the node existing on a curved road section, based on the passing-state determination amount. The passable speed calculating means calculates the passable speed based on a preset yaw rate limit that is permissible in the passage of the vehicle through the node, and the passing-state determination amount according to the following equation:

passable speed=preset limit yaw rate/passing-state determination amount

Thus, it is possible to accurately calculate a passable speed which does not exceed the preset yaw rate limit.

The above and other objects, features and advantages of the invention will become apparent from the following description of the preferred embodiments taken in conjunction with the accompanying drawings.

BRIEF DESCRIPTION OF THE DRAWINGS

FIGS. 1 to 12B illustrate an embodiment of the present invention, wherein

FIG. 1 is a block diagram illustrating the present system according to the embodiment of the present invention;

FIG. 2 is an illustration for explaining a function of road shape determining means;

FIG. 3 is a diagram for explaining a pre-reading section and a searching section utilized by the present system;

FIG. 4 is a first portion of a flow chart illustrating the operational steps of the present system;

FIG. 5 is a second portion of the flow chart;

FIG. 6 is a third portion of the flow chart;

FIG. 7 is an illustration for explaining a link length $I_N$ and a crossed axes angle $\theta_N$;

FIGS. 12A and 12B illustrate shortcomings with the prior art;

FIGS. 13 to 17 illustrate a first modification of the present invention, wherein FIG. 13 is a block diagram of the entire arrangement of the system;

FIG. 14 is a diagram for explaining a pre-reading section and a searching section;

FIG. 15 is a third portion of a flow chart corresponding to FIG. 6;

FIGS. 16 and 17 illustrate shortcomings with the prior art;

FIGS. 18 to 20 illustrate a second modification of the present invention, wherein FIG. 18 is a block diagram of the entire arrangement of a system;

FIG. 19 is a third portion of a flow chart corresponding to FIG. 6; and

FIG. 20 is an illustration for explaining the operation of the present system.

DETAILED DESCRIPTION OF THE PREFERRED EMBODIMENTS

The present invention will now be described by way of a preferred embodiment with reference to FIGS. 1 to 11B.

Figure 1:
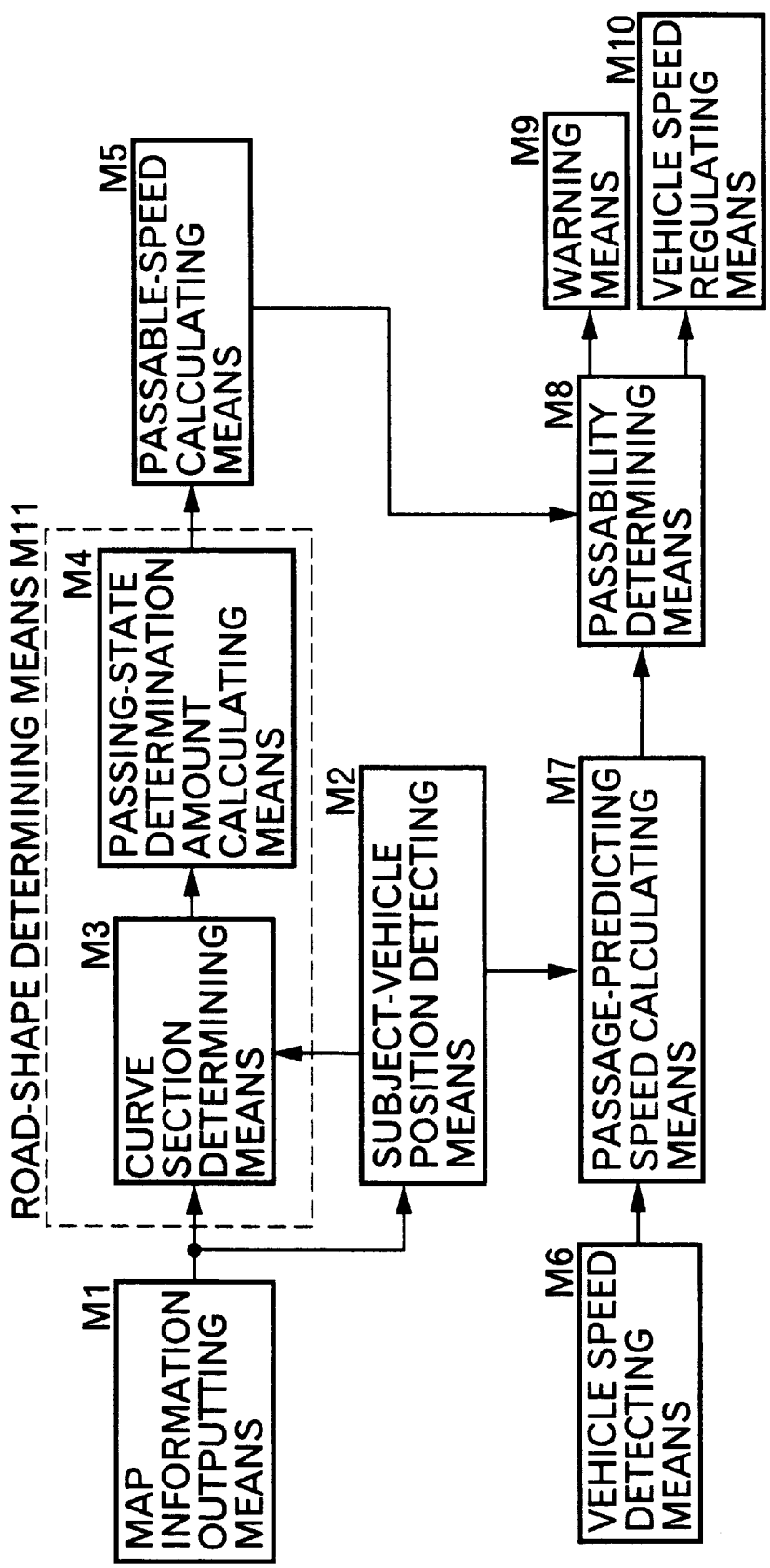

Referring to FIG. 1, a system for determining whether a vehicle can pass according to the present invention includes map information outputting means M1, subject-vehicle position detecting means M2, curve-section determining means M3, passing-state determination-amount calculating means M4, passable-speed calculating means M5, vehicle speed detecting means M6, passage-predicting speed calculating means M7, passability determining means M8, vehicle control warning means M9, and vehicle speed regulating means M10. The curve-section determining means M3 and the passing-state determination-amount calculating means M4 constitute road-shape determining means M11.

The map information outputting means M1 and the subject-vehicle position detecting means M2 are mounted in a known navigation system for a motor vehicle. The map information outputting means M1 reads and outputs road data in a predetermined range previously stored on an IC card, a CD-ROM, a photo-magnetic disk or other device on which data can be rewritten. The subject-vehicle position detecting means M2 detects the position of the subject vehicle on a map by superposing subject-vehicle data received from a GPS transmission. The road data is comprised of a large number of nodes $N_N$ established at predetermined distances along a road.

Figure 2:
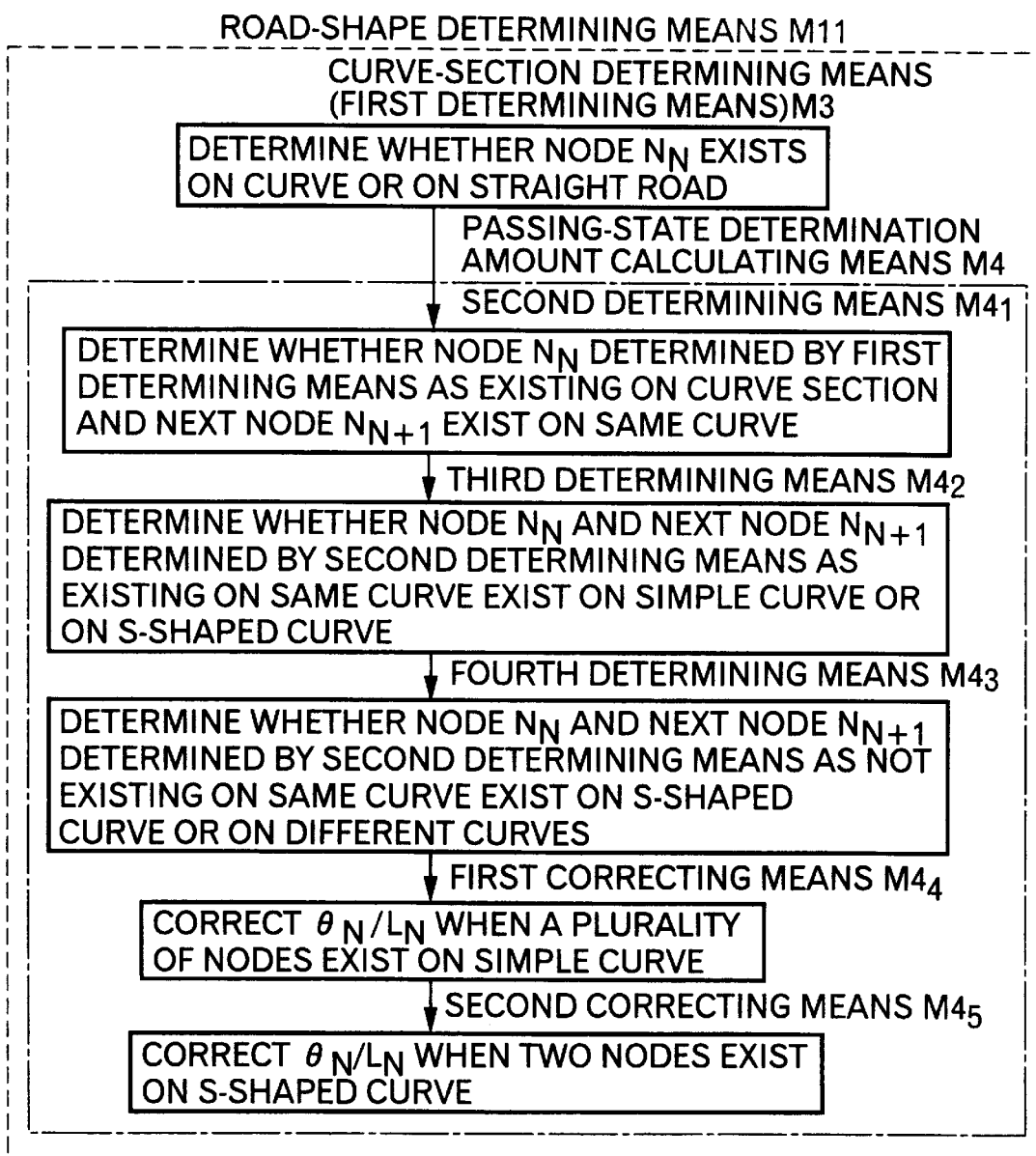

As can be seen from FIG. 1 in combination with FIG. 2, the curve-section determining means M3 includes first determining means for determining whether a node $N_N$ ahead of the position P of the subject vehicle exists on a curve or on a straight road section, based on the road data and the position P of the subject vehicle. The passing-state determination-amount calculating means M4 includes second determining means $M4_1$ whose contents will be described hereinafter, third determining means $M4_2$, fourth determining means $M4_3$, first correcting means $M4_4$ and second correcting means $M4_5$. The passing-state determining-amount calculating means M4 calculates a passing-state determination amount $\theta_N/L_N$ which is used in determining whether the vehicle can pass through a curve.

The passable-speed determining means M5 calculates a passable speed $V_{maxN}$ which is a maximum vehicle speed at which the vehicle can pass safely through the Node $N_N$, based on the passing-state determination amount $\theta_N/L_N$ and a preset lateral acceleration limit G (or preset yaw rate limit YR) previously set at a value at which a driver can drive the vehicle to safely pass through a curve.

The vehicle speed detecting means M6 detects a current vehicle speed V of the subject vehicle based on output generated by wheel speed sensors mounted on the vehicle wheels. The passage-predicting speed calculating means M7 calculates a passage-predicting speed $V_N$ at which the vehicle will pass through the node $N_N$, based on the vehicle speed V, the position P of the subject vehicle and a reference deceleration rate or value β previously set for the vehicle. The passability determining means M8 compares the passage-predicting speed $V_N$ with the passable speed $V_{maxN}$. If $V_N \leq V_{maxN}$, then it is determined that the vehicle can pass through the node $N_N$, and if $V_N > V_{maxN}$, then it is determined that it is difficult for the vehicle to pass through the node $N_N$, at which point the warning means M9 comprising a buzzer or a lamp is activated to alert the driver to decelerate the vehicle, and the vehicle speed regulating means M10 comprising automatic brake means or engine output reducing means is operated to automatically decelerate the vehicle.

Figure 3:
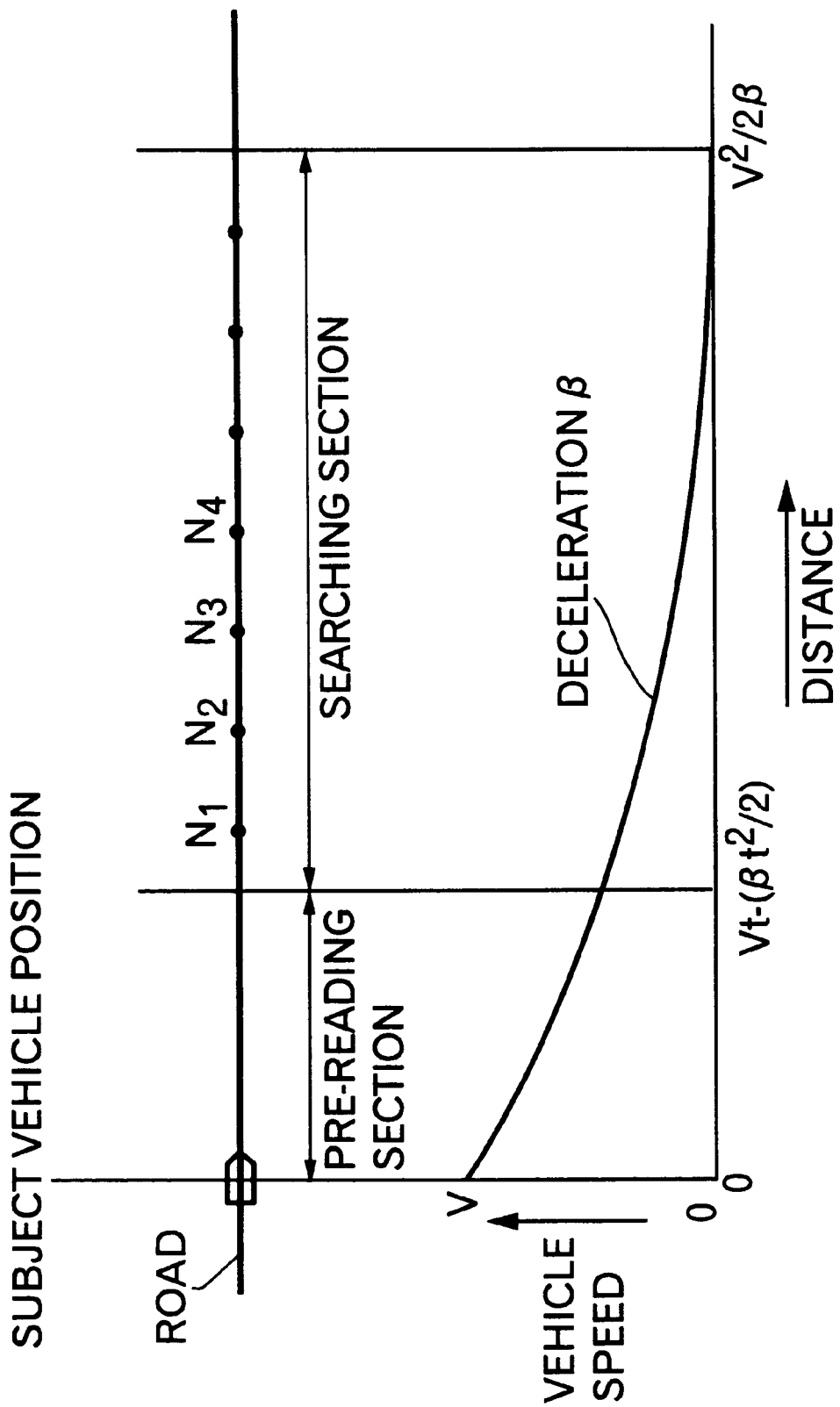

As shown in FIG. 3, a pre-reading section and a searching section are established on a road ahead of the position P of the subject vehicle. The pre-reading section is established between the position P of the subject vehicle and the node $N_N$ through which it is determined that the vehicle can pass, in order to ensure a predetermined time t exists until the vehicle passes through the pre-reading section and reaches the node $N_N$. The pre-reading section thereby allows for a sufficient time to determine the passibility of the vehicle and to operate the warning means M9 and the vehicle speed regulating means M10. The searching section is established for determining whether the vehicle can pass through the node $N_N$ existing within the searching section. Thus, determinations of vehicle passability through distant nodes $N_N$ far ahead of the searching section are avoided.

The pre-reading section is determined by a distance $Vt-(\beta t^2/2)$ through which the vehicle travels within the predetermined time t, wherein β represents a previously set reference deceleration rate or value which is presumed to be generated by braking action spontaneously initiated by the driver at the position P of the subject vehicle in order to allow the vehicle to pass through a curve ahead of the subject vehicle. A starting point of the searching section is established at a terminal end of the pre-reading section, and a terminal end of the searching section is set at a location at which the vehicle, which decelerated at the reference deceleration rate β, is stopped, i.e., at a location spaced apart from the subject vehicle position P by a distance $V^2/2\beta$.

Figure 4:
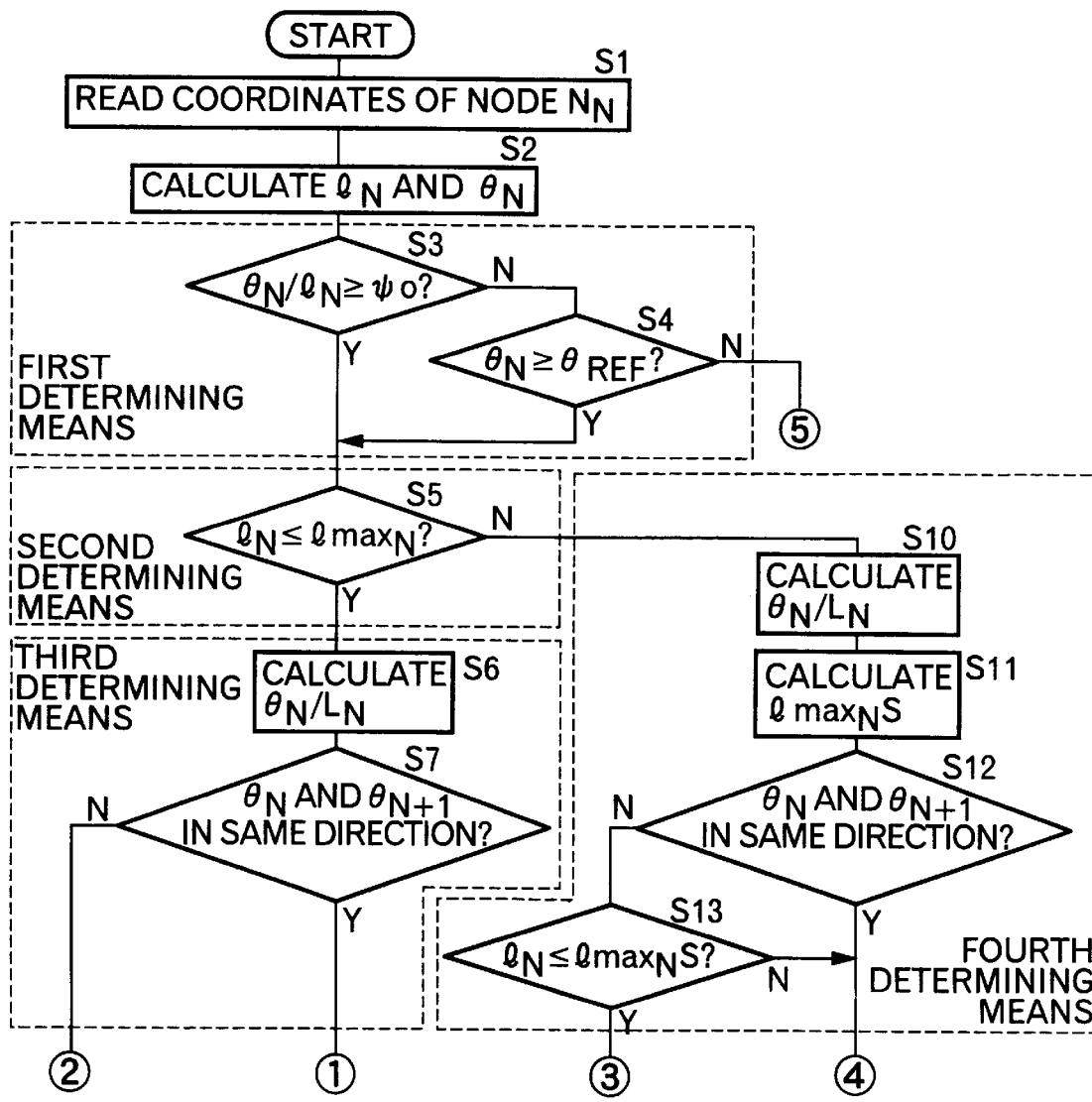
Figure 5:
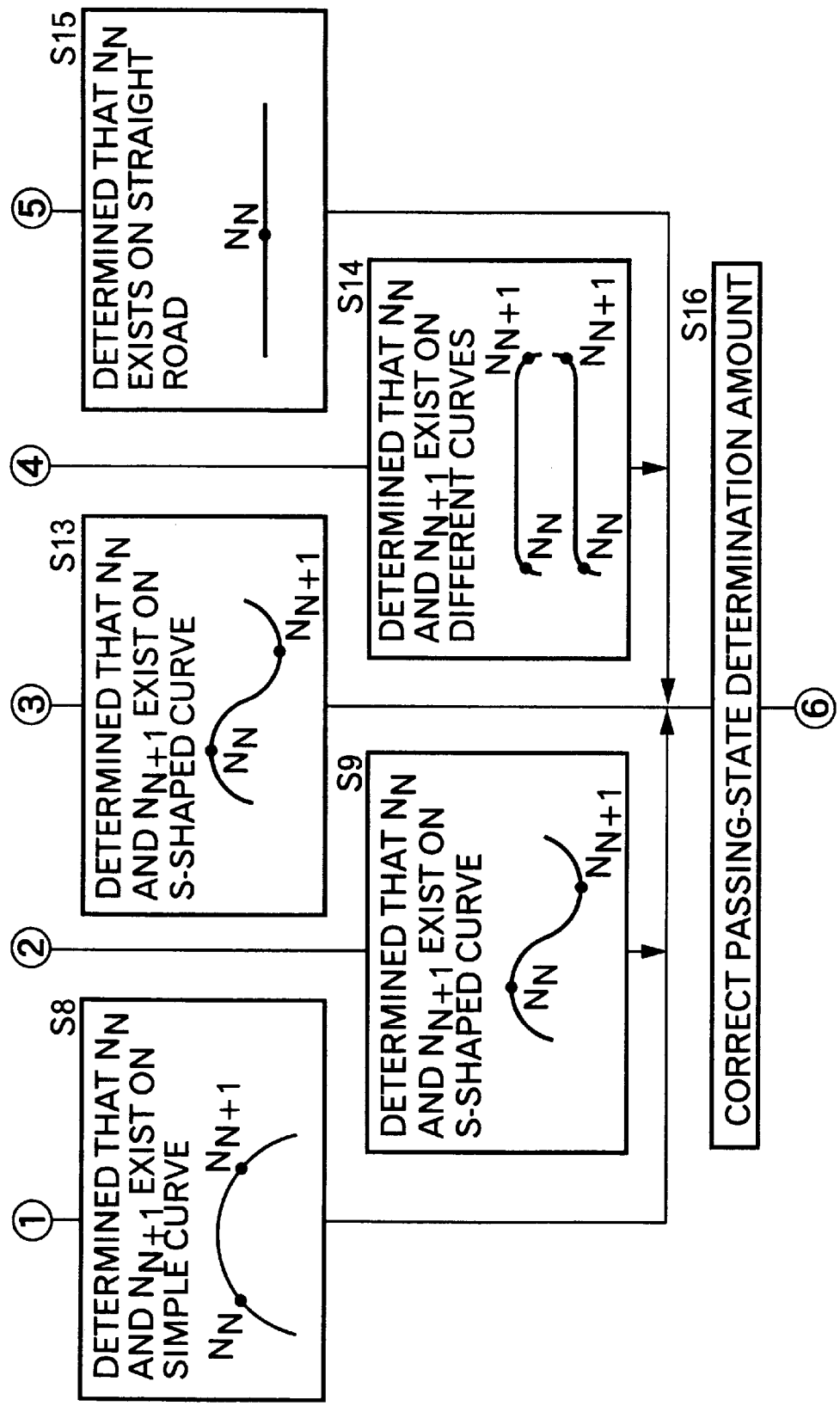
Figure 6:
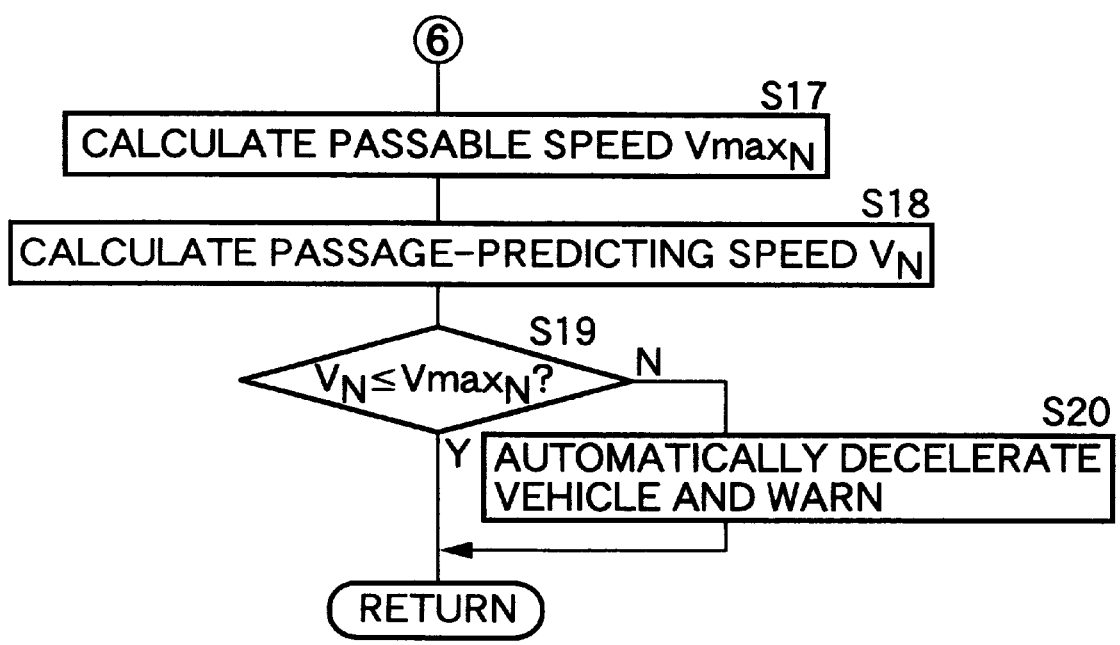

The operation of the embodiment of the present invention will be described below with reference to flow charts in FIGS. 4 to 6.

Figure 7:
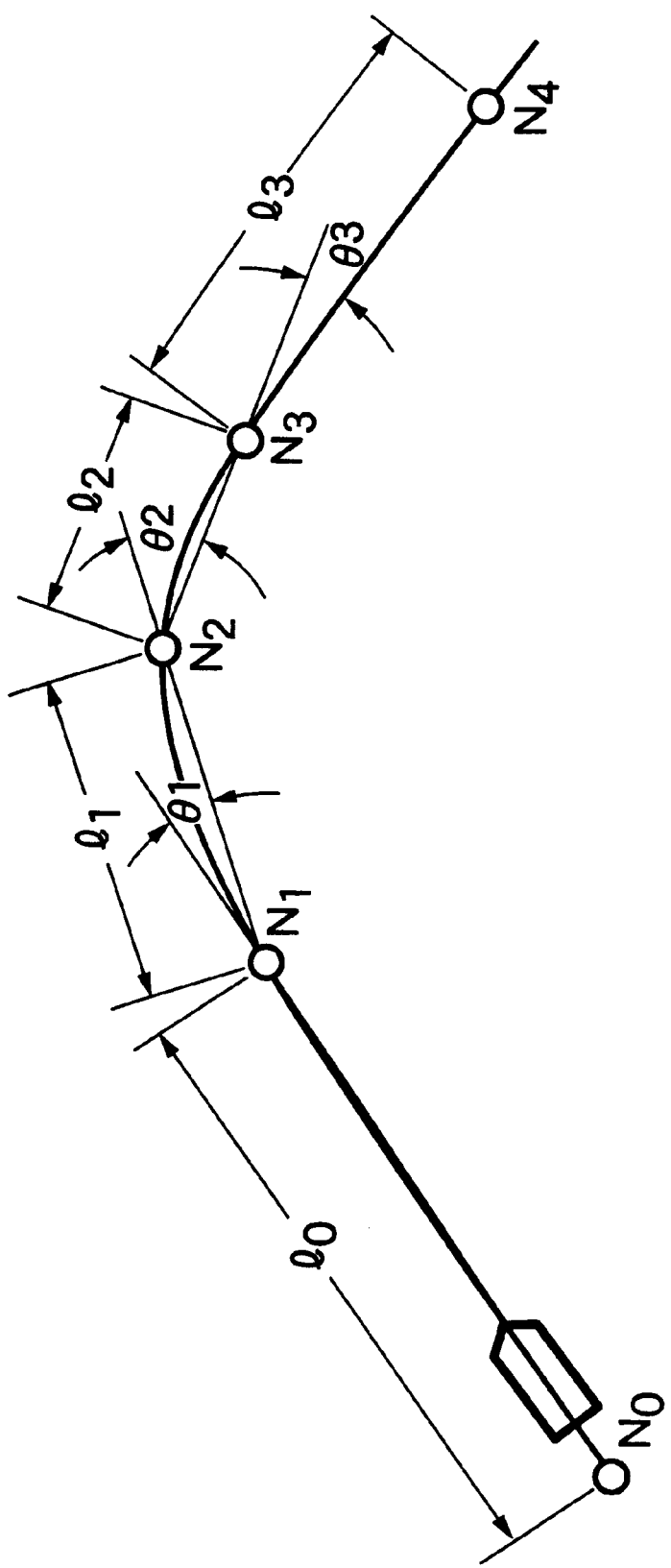

First, at step S1, coordinate points of a plurality of nodes $N_N$ ($N_N=N_1, N_2, N_3 \ldots$) existing in the searching section are read, and at step S2, a link length $l_N$ and a crossed axes angle $\theta_N$ at each of the nodes $N_N$ are read. As shown in FIG. 7, the link length $l_N$ is defined as a distance between adjacent nodes $N_N$ and $N_{N+1}$, and the crossed axes angle $\theta_N$ is defined as an angle formed between a link $N_{N-1}N_N$ and a link $N_N N_{N+1}$ located ahead of the link $N_{N-1}N_N$. The link length $l_N$ and the crossed axes angle $\theta_N$ can be geometrically calculated from the fact that the position of each of the nodes $N_N$ is provided by the coordinates.

Next, the first determining means of curve section determining means M3 determines whether the node $N_N$ exists on a curve or on a straight road, as shown in FIG. 2. This determination is performed by calculating $\theta_N/1_N$ at each of the nodes $N_N$ at step S3 and comparing the $\theta_N/1_N$ with a previously set first determining reference value $\phi_{REF}$. If $\theta_N/1_N \leq \phi_{REF}$, then it is determined that the node $N_N$ exists on a curve, thereby proceeding to step S5. The $\theta_N/1_N$ corresponds to an amount of variation in azimuth angle of the vehicle relative to the distance of movement of the vehicle. A larger value of $\theta_N/1_N$ indicates that the road is curved, and a smaller value of $\theta_N/1_N$ indicates that the road is straight.

Even if $\theta_N/1_N < \phi_{REF}$ at step S3, the crossed axes angle $\theta_N$ is compared with a second determining reference value $\theta_{REF}$. If $\theta_N \geq \theta_{REF}$, i.e., if the crossed axes angle $\theta_N$ itself is equal to or larger than the second determining reference value $\theta_{REF}$, it is determined that the road is curved, and the system proceeds to step S5. On the other hand, if $\theta_N/1_N < \phi_{REF}$ at step S3 and $\theta_N < \theta_{REF}$ at step S4, it is determined at step S15 that the road is straight. When the road is straight, a passing-state determination amount $\theta_N/L_N$, which will be described hereinafter, is set at zero.

If it is determined by the curve section determining means (the first determining means) M3 that the node $N_N$ exists on the curve, it is determined by the second determining means $M4_1$ whether two continuous nodes $N_N$ and $N_{N+1}$ exist on the same curve. The determination by the second determining means $M4_1$ is carried out by comparing the link length $I_N$ between the nodes $N_N$ and $N_{N+1}$ with a third determining reference value $I_{maxN}$ at step S5. If $I_N \leq I_{maxN}$, it is determined that the nodes $N_N$ and $N_{N+1}$ exist on the same curve, proceeding to step S6. If $I_N > I_{maxN}$, it is determined that the nodes $N_N$ and $N_{N+1}$ do not exist on the same curve, and the system proceeds to step S10.

Figure 8A:
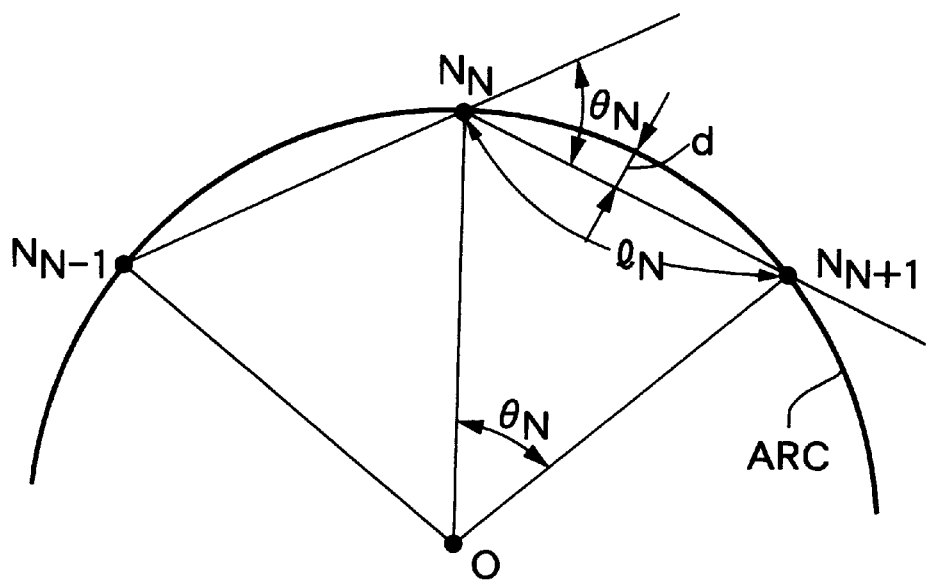
FIGS. 8A and 8B are illustrations for explaining step S5 in the flow chart.
Figure 8B:
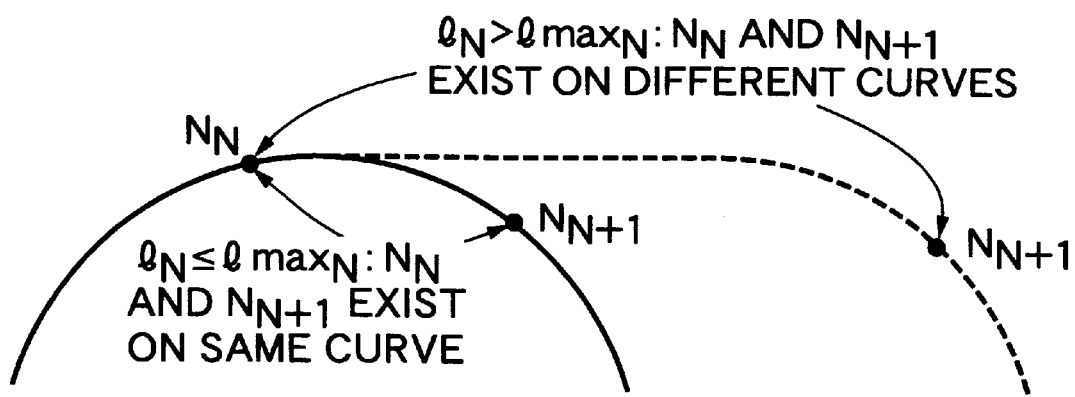

Step S5 will be described below with reference to FIGS. 8A and 8B. FIG. 8A shows a state in which three nodes $N_{N-1}$ $N_N$ and $N_{N+1}$ are arranged along the same arcuate path about a center O, as a representative example of a common curve. The crossed axes angle $\theta_N$ at the node $N_N$ is equal to a center angle $\angle N_N O N_{N+1}$ of the arc and hence, the link length $I_N$ between the node N and $N_{N+1}$ is given according to $$I_N = 2d/\tan(\theta_N/4) \quad (1)$$

wherein d is a sag between the nodes $N_N$ and $N_{N+1}$.

The sag d is a value which is a criterion for determining the distance (i.e., the link length $I_N$) between the adjacent nodes $N_N$ when data for a road map are made. By determining the position of each node $N_N$ so that the sag d is equal to or smaller than a predetermined value (such as between approximately 3.5 m to 6 m), the shape of a road is expressed by a minimum number of nodes $N_N$. As a result, nodes $N_N$ are densely disposed such that the link length $I_N$ between adjacent nodes $N_N$ is smaller in a sharp curve. Nodes $N_N$ are disposed roughly along a less sharp curve such that the link length $I_N$ between the adjacent nodes $N_N$ is larger.

Thus, the third determining reference value $I_{Nmax}$ is defined as a maximum link length according to $$I_{maxN} = 2d/\tan(\theta_N/4) \quad (2)$$

and if $I_N \leq I_{maxN}$ is established at step S5, it is determined that the nodes $N_N$ and $N_{N+1}$ exist on the same curve. If $I_N \leq I_{maxN}$ is not established, it is determined that the nodes $N_N$ and $N_{N+1}$ exist on different curves (see FIG. 8B).

If it is determined in the second determining means $M4_1$ that the nodes $N_N$ and $N_{N+1}$ exist on the same curve, then passing-state determination amounts $\theta_1/L_1 \ldots \theta_N/L_N$ of an N number of nodes $N_1 \ldots N_N$ existing on the same curve are determined at step S6 in the following manner. For a first N−1 number of nodes $N_1$ to $N_{N-1}$, passing-state determination amounts $\theta_K/L_K$ (K=1 to N−1) are determined according to $$\theta_K/L_K \leftarrow \theta_K/I_K$$

A passing-state determination amount $\theta_N/L_N$ of a final N-th node $N_N$ is determined according to $$\theta_N/L_N \leftarrow \theta_N/(I_{N-1} \text{ or a shorter value of } I_{maxN}) \quad (4)$$

wherein $I_{maxN}$ is equal to $2d/\tan(\theta_N/4)$ defined in the equation (2).

Figure 9A:
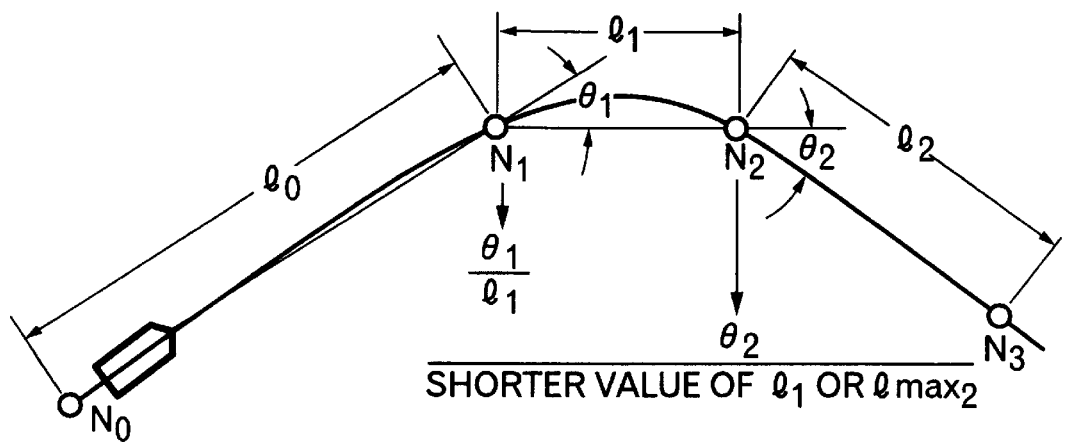
FIGS. 9A, 9B and 9C are illustrations for explaining the definition of a passing-state determination amount $\theta_N/L_N$.
Figure 9B:
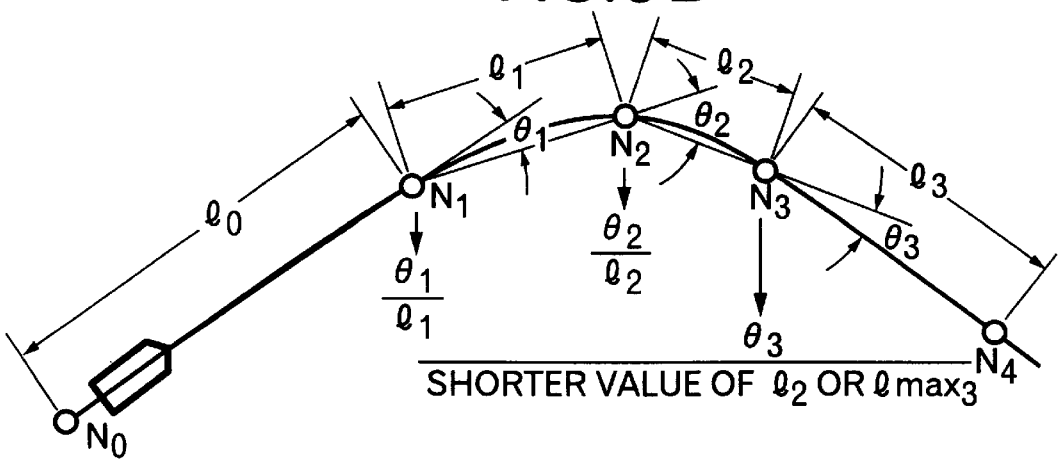

Specifically, when two consecutive nodes $N_1$ and $N_2$ exist on the same curve, as shown in FIG. 9A, a passing-state determination amount $\theta_1/L_1$ for the first node $N_1$ is determined as $\theta_1/I_1$, and a passing-state determination amount $\theta_2/L_2$ for the second (last) node $N_2$ is determined as $\theta_2/(I_2$ or a shorter value of $I_{max2})$. When three consecutive nodes $N_1$, $N_2$ and $N_3$ exist on the same curve, as shown in FIG. 9B, passing-state determination amounts $\theta_1/L_1$ and $\theta_2/L_2$, respectively, for the first and second nodes $N_1$ and $N_2$ are determined as $\theta_1/I_1$ and as $\theta_2/I_2$, and a passing-state determination amount $\theta_3/L_3$ for the third node $N_3$ is determined as $\theta_3/(I_2$ or a shorter value of $I_{max3})$.

The last node $N_N$ of a plurality of consecutive nodes $N_1, \ldots N_N$ on the same curve can be determined at the time when the answer at step S5 is changed from YES to NO.

The direction of the crossed axes angle $\theta_N$ of the node $N_N$ is compared with the direction of the crossed axes angle $\theta_N$ of the node $N_{N+1}$ at subsequent step S7. If these directions are the same, it is determined at step S8 that the two nodes $N_N$ and $N_{N+1}$ exist on a simple curve (a curve having a constant curving direction). If the directions are opposite, it is determined at step S9 that the two nodes $N_N$ and $N_{N+1}$ exist on an S-shaped curve (a curve having a direction of curvature change from the right to the left or from the left to the right).

On the other hand, if it is determined by the second determining means $M4_1$ (at step S5) that the nodes $N_N$ and $N_{N+1}$ do not exist on the same curve, the passing-state determination amount $\theta_N/L_N$ for the sole node $N_N$ existing on a curve is determined by the third determining means $M4_2$ at step S10 as $$\theta_N/L_N = \theta_N/I_{maxN} \quad (5)$$

Figure 9C:
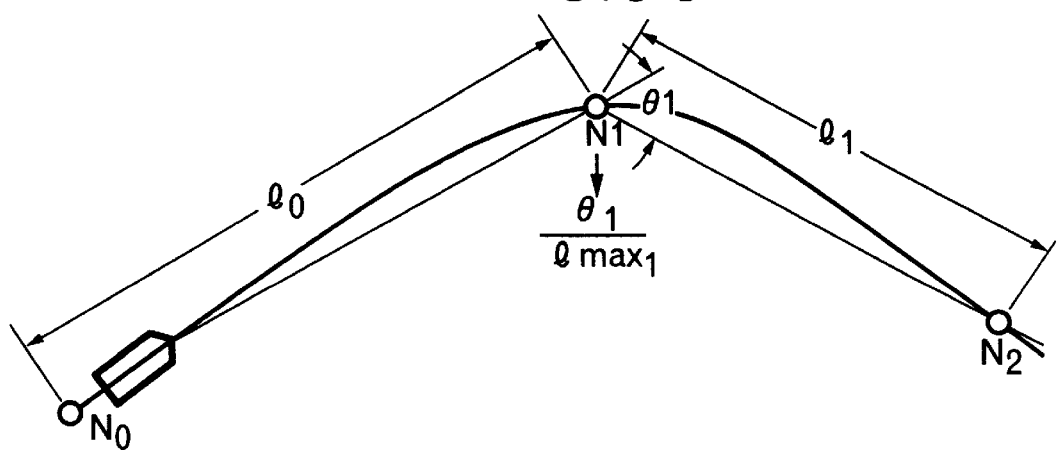

(see FIG. 9C).

At subsequent step S11, a fourth determining reference value $I_{maxN}S$ is calculated using $L_N$ and $L_{N+1}$ in equation (5) according to the following equation:

$$I_{maxN}S = L_N + L_{N+1} \quad (6)$$

The meaning of the fourth determining reference value $I_{maxN}S$ will be described hereinbelow.

Next, at step S12, the direction of the crossed axes angle $\theta_N$ of the node N is compared with the direction of the crossed axes angle $\theta_{N+1}$ of the node $N_{N+1}$. If these directions are the same, it is determined at step S14 that the two nodes $N_N$ and $N_{N+1}$ exist on two different curves which curve in the same direction.

On the other hand, if the crossed axes angles $\theta_N$ and $\theta_{N+1}$ are opposite at step S12, the link length $I_N$ is further compared with the fourth determining reference value $I_{maxN}S$ at step S13. If $I_N \leq I_{maxN}S$, it is determined at step S13 that the two nodes $N_N$ and $N_{N+1}$ exist on two different curves which are curved in the opposite directions.

Figure 10A:
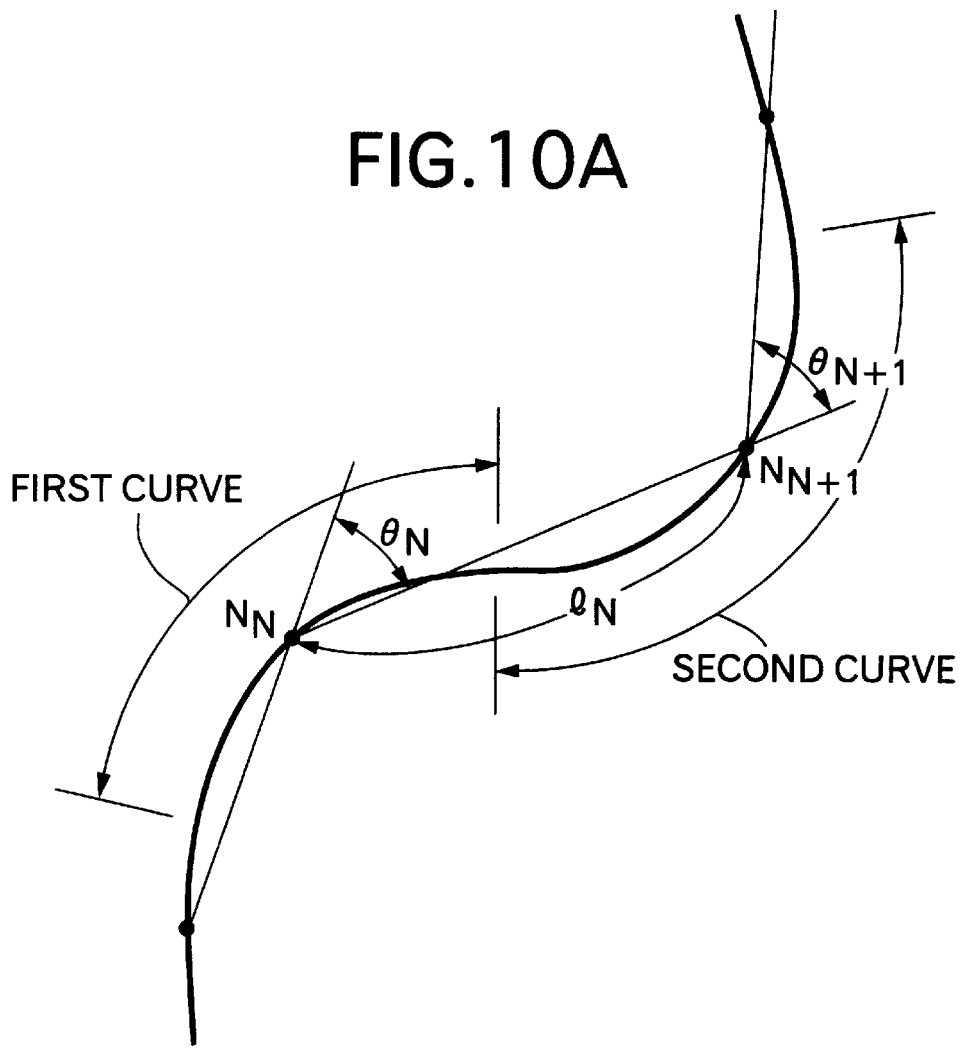
FIGS. 10A and 10B are illustrations for explaining step S13 in the flow chart.
Figure 10B:
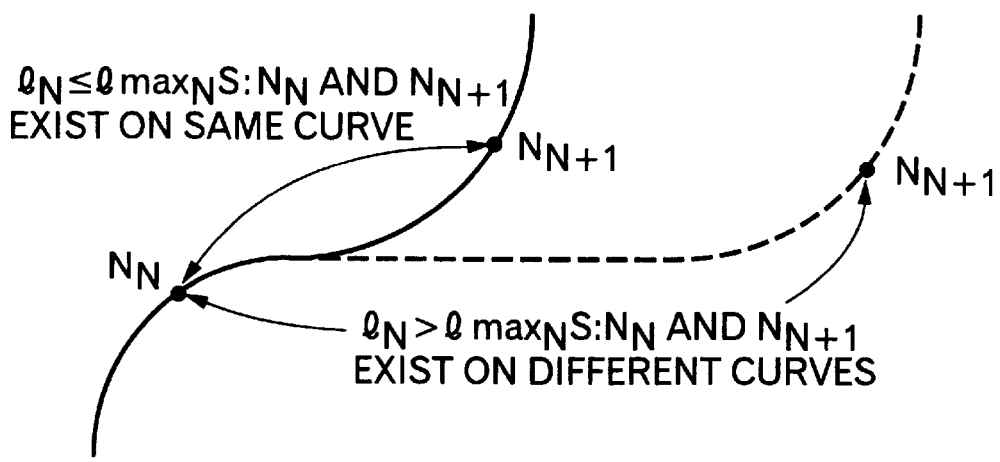

The significance of step S13 is as follows. Suppose that a node $N_N$ exists on a first curve portion of an S-shaped curve made by two continuous arcs in opposite directions and a node $N_{N+1}$ exists on a second curve portion, as shown in FIG. 10A. In this case, a passing-state determination amount $\theta_N/L_N$ in order for the vehicle to pass through the node $N_N$ and a passing-state determination amount $\theta_{N+1}/L_{N+1}$ in order for the vehicle to pass through the node $N_{N+1}$ are $\theta_N/I_{maxN}$ and $\theta_{N+1}/I_{maxN+1}$, respectively, using equation (5). Therefore, when the first and second curve portions are directly continuous to each other in an S-shape, the link length $I_N$ between the nodes $N_N$ and $N_{N+1}$ must be equal to or smaller than $I_{maxN}+I_{maxN+1}=I_{maxN}S$, as shown in FIG. 10B. Conversely, if the link length $I_N$ between the nodes $N_N$ and $N_{N+1}$ exceeds $I_{maxN}+I_{maxN+1}=I_{maxN}S$, the first and second curve portions must be separate curve portions continuous to each other through a straight road portion disposed therebetween.

If the state of the node $N_N$ on the curve is classified into five types at steps S8, S9, S13, S14 and S15 in the above manner (FIG. 5), the passing-state determination amount $\theta_N/L_N$ calculated at steps S6 and S10 is corrected by the first and second correcting means $M4_4$ and $M4_5$ at subsequent step S16.

Figure 11A:
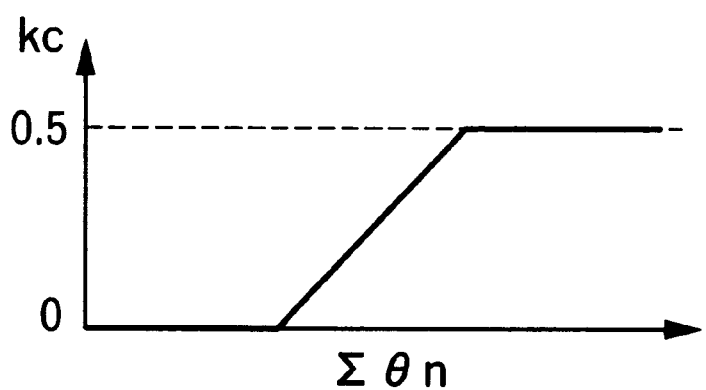
FIGS. 11A and 11B are illustrations of maps for searching correcting factors $K_C$ and $K_S$.

First, the correction carried out by the first correcting means $M4_4$ when a plurality of nodes $N_N$ exist on a simple curve (as shown in step S8) will be described. The passing-state determination amount $\theta_N/L_N$ in this case is calculated at step S6, but even if the calculated value of the passing-state determination amount $\theta_N/L_N$ is the same, it is more difficult for the vehicle to pass, because the total of crossed axes angles $\theta_N$ on the curve is relatively large. The reason can be understood from the fact that even with curves having the same radius of curvature, it is more difficult for the vehicle to pass through the curve with the direction of movement of the vehicle being changed through 90°, than for the vehicle to pass through the curve with the direction of movement of the vehicle being changed through 30°. Thereupon, a sum $\Sigma\theta_N$ of crossed axes angles $\theta_N$ of a plurality of nodes $N_N$ existing on the curve is calculated as shown in FIG. 11A, and a correcting factor $K_C$ is searched from a map, using this sum $\Sigma\theta_N$ as a parameter. Then, using the correcting factor $K_C$, the passing-state determination amount $\theta_N/L_N$ is corrected according to the following expression:

$$\theta_N/L_N \leftarrow (\theta_N/L_N) \times (1+K_C) \qquad (7)$$

As the sum $\Sigma\theta_N$ of the crossed axes angles $\theta_N$ is increased, the correcting factor $K_C$ is increased from 0.0 to 0.5. Therefore, the maximum corrected passing-state determination amount $\theta_N/L_N$ is 1.5 times the original passing-state determination amount $\theta_N/L_N$, whereby the value of the passing-state determination amount $\theta_N/L_N$ is compensated to take into account the difficulty of passage when the vehicle actually passes through the curve.

Figure 11B:
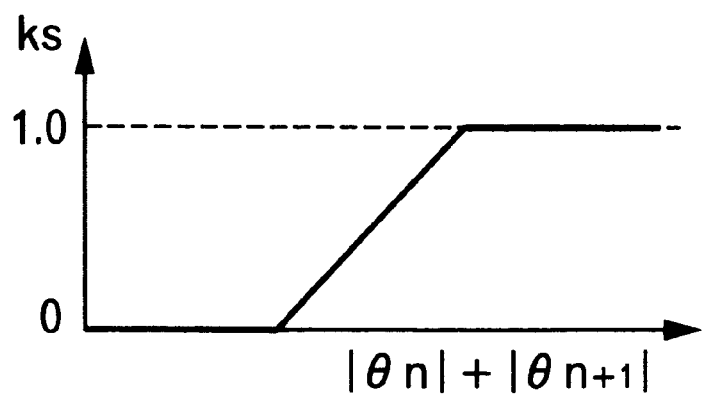
Figure 12A:
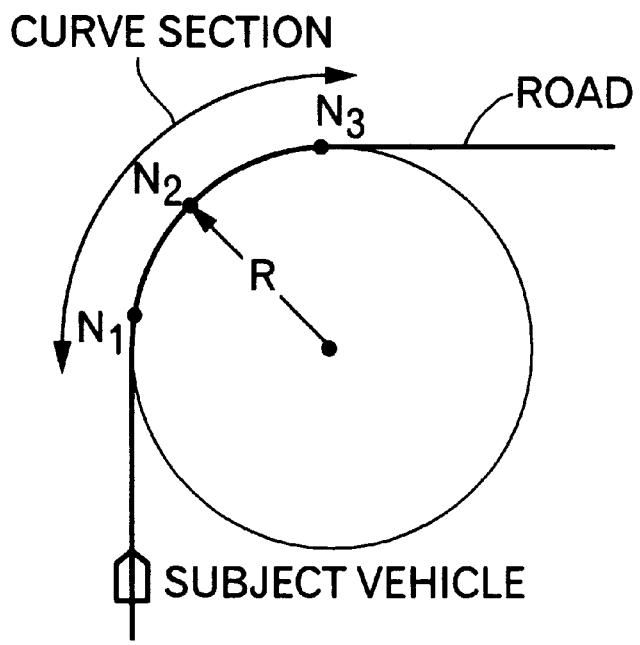
Figure 12B:
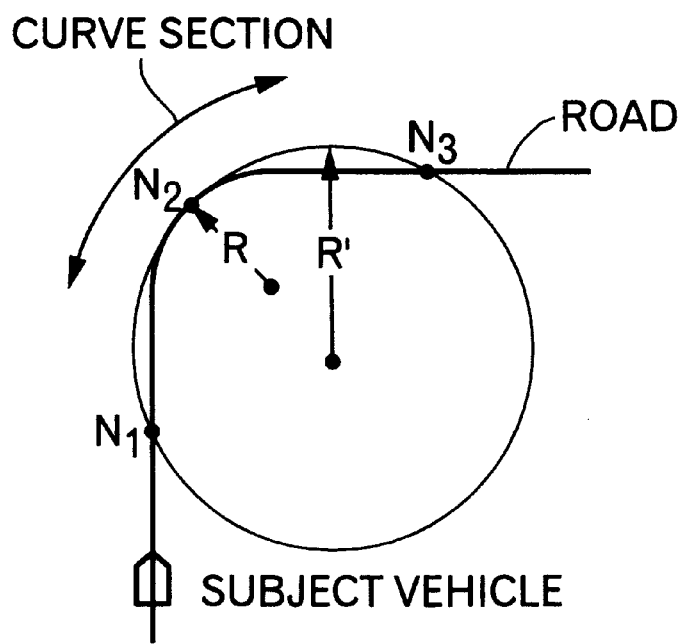

The correction carried out by the second correcting means $M4_5$ when two nodes $N_N$ and $N_{N+1}$ exist on an S-shaped curve (as shown in steps S9 and S13) will be described below. The passing-state determination amount $\theta_N/L_N$ in this case is calculated at steps S6 and S10, but even if the calculated values of the passing-state determination amounts $\theta_N/L_N$ are the same, it is more difficult for the vehicle to pass through the S-shaped curve than to pass through a curve curved in only one direction. Thereupon, a correcting factor $K_S$ is searched from the map, using, as a parameter, a sum $|\theta_N|+|\theta_{N+1}|$ of the absolute values of the crossed axes angles $\theta_N$ and $\theta_{N+1}$ of the two nodes $N_N$ and $N_{N+1}$, as shown in FIG. 11B. Then, the passing-state determination amount $\theta_N/L_N$ is corrected using the correcting factor $K_S$ according to the following expression:

$$\theta_N/L_N \leftarrow (\theta_N/L_N) \times (1+K_S) \qquad (8)$$

As the sum $|\theta_N|+|\theta_{N+1}|$ of the absolute values of the crossed axes angles $\theta_N$ and $\theta_{N+1}$ is increased, the correcting factor $K_S$ is increased from 0.0 to 1.0. Therefore, the maximum corrected passing-state determination amount $\theta_N/L_N$ is 2.0 times the original passing-state determination amount $\theta_N/L_N$, whereby the value of the passing-state determination amount $\theta_N/L_N$ can be compensated to take into account the difficulty of passage when the vehicle actually passes through the curve.

A yaw rate YR of the vehicle at a node $N_N$ is given by $\theta_N/t$ resulting from division of the crossed axes angle $\theta_N$ which is an amount of variation in direction of movement of the vehicle by a time $t$ required to generate such yaw rate. The time $t$ is given by $I_N/V$ resulting from division of the link length $I_N$ by a vehicle speed $V$ at which the vehicle passes therethrough. By combining these equations, a final yaw rate YR is calculated as a product of the passing-state determination amount $\theta_N/L_N$ and the vehicle speed $V$. Yaw rate YR is thus seen as $$YR = \theta_N/t = \theta_N/(I_N/V) = (\theta_N/I_N) \times V \qquad (9)$$

In addition, a lateral acceleration G of the vehicle is given by a product of the yaw rate YR and the vehicle speed V.

$$G = YR \times V \qquad (10)$$

Thus, the vehicle speed V is calculated at step S17 according to the following equation:

$$V = \{G/(\theta_N/L_N)\}^{1/2} \qquad (11)$$

given from the equations (9) and (10). Equation (11) for vehicle speed indicates that if a preset limit lateral acceleration G permissible when the vehicle passes through a curve is defined, a passable speed $V_{maxN}$ for passage of the vehicle through the curve is provided based on the preset limit lateral acceleration G and the passing-state determination amount $\theta_N/L_N$. The passable speed $V_{maxN}$ is a maximum vehicle speed at which the vehicle can pass through the curve with a lateral acceleration of the vehicle not exceeding the preset limit lateral acceleration G.

On the other hand, a passage-predicting speed $V_N$ for passage of the vehicle through the node $N_N$, when it is supposed that the vehicle has been decelerated at a reference deceleration $\beta$ from the subject vehicle position P, is calculated at step S18 according to the following equation:

$$V_N = (V^2 - 2\beta S_N)^{1/2} \qquad (12)$$

wherein $S_N$ represents a distance from the position P of the subject vehicle to the node $N_N$.

At subsequent step S19, the passage-predicting speed $V_N$ is compared with the passable speed $V_{maxN}$. If $V_N \leq V_{maxN}$, it is determined that the vehicle can pass through the node $N_N$. If $V_N > V_{maxN}$, it is determined that it is difficult for the vehicle to pass through the node $N_N$. When it is determined that it is difficult for the vehicle to pass through the node $N_N$, the warning means M9 is operated at step S20 to alert the driver to decelerate the vehicle, and at the same time the vehicle speed regulating means M10 is operated to automatically decelerate the vehicle. Thus, the spontaneous braking by the driver or the automatic deceleration is performed to reduce the vehicle speed, thereby enabling the vehicle to safely and reliably pass through the curve.

When it is determined at steps S3 and S4 that the node $N_N$ exists on the curve, as described above, the passing-state determination amount $\theta_N/L_N$ for passage through the node $N_N$ existing on the curve is calculated. The present system avoids the unnecessary calculation of passing state determination amount $\theta_N/L_N$ when the vehicle travels on a straight road section, thereby reducing calculation load and the size of the electronic control unit (ECU). In addition, since the determination of whether the vehicle can pass is carried out using the passing-state determination amount $\theta_N/L_N$ which is a parameter accurately representing a degree of difficulty in the passage of the vehicle through the node, even if only one node or two nodes $N_N$ exist on a curve, the determination of whether the vehicle can pass through the node or nodes can be correctly performed.

Although the embodiment of the present invention has been described in detail, it will be understood that the present invention is not limited to the above-described embodiment, and various modifications may be made without departing from the spirit and scope of the invention defined in claims.

For example, the passable speed $V_{maxN}$ has been calculated based on the preset limit lateral acceleration G in the embodiment, but the passable speed $V_{maxN}$ may be calculated based on the preset limit yaw rate YR in place of the preset limit lateral acceleration G. In other words, the passable speed $V_{maxN}$ may be calculated from the equation (9) according to the following equation:

$$V_{maxN} = YR/(\theta_N/L_N) \quad (13)$$

A first modification to the embodiment will be described below with reference to FIGS. 13 to 17.

A prior vehicle control system is disclosed in Japanese Patent Application Laid-open No.8-147598, wherein when it is determined that a vehicle cannot pass a curve ahead of the vehicle, a warning is first provided to a driver to alert the driver to decelerate the vehicle, and when it is determined that the vehicle still cannot pass through the curve, an automatic deceleration is carried out.

The above known system employs the following two techniques.

Figure 16:
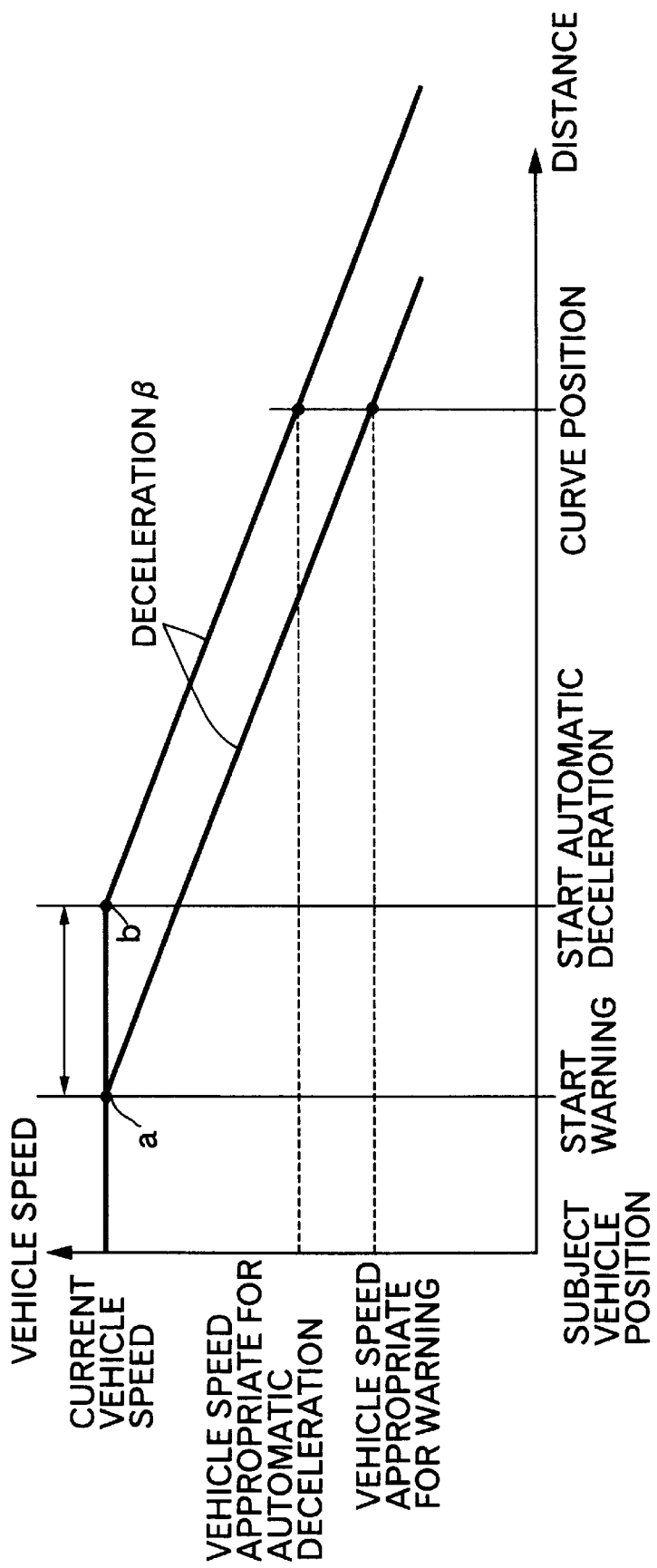

In the first technique, when the vehicle is moving at an excessive speed when approaching a curve, as shown in FIG. 16, a warning is first emitted at a point a and then automatic deceleration of the vehicle is started at a point b. The point a is a location where if the deceleration of the vehicle is carried out at a reference deceleration rate or value β from such point, the vehicle speed is reduced at the curved road section to a value suitable for issuing the warning. The point b is a location where if the deceleration of the vehicle is carried out at a reference deceleration vale β from such point, the vehicle speed is reduced at the curve to a value suitable for automatic vehicle deceleration which is at a speed that is greater than the velocity value suitable for only receiving a warning. In this case, a distance between the points a and b is determined in accordance with the vehicle speed suitable for the warning, the vehicle speed suitable for automatic deceleration and the reference deceleration value or rate β, irrespective of the vehicle speed at the position of the subject vehicle. In other words, if the vehicle speed at the position of the subject vehicle is varied, the time taken until the vehicle passes through the point b after passing through the point a, namely, the time taken until the automatic deceleration is started after emission of the warning, is varied. Thus, this potential time variation provides a level of inconsistency in the way the prior system addresses vehicles approaching a curved road section.

Figure 17:
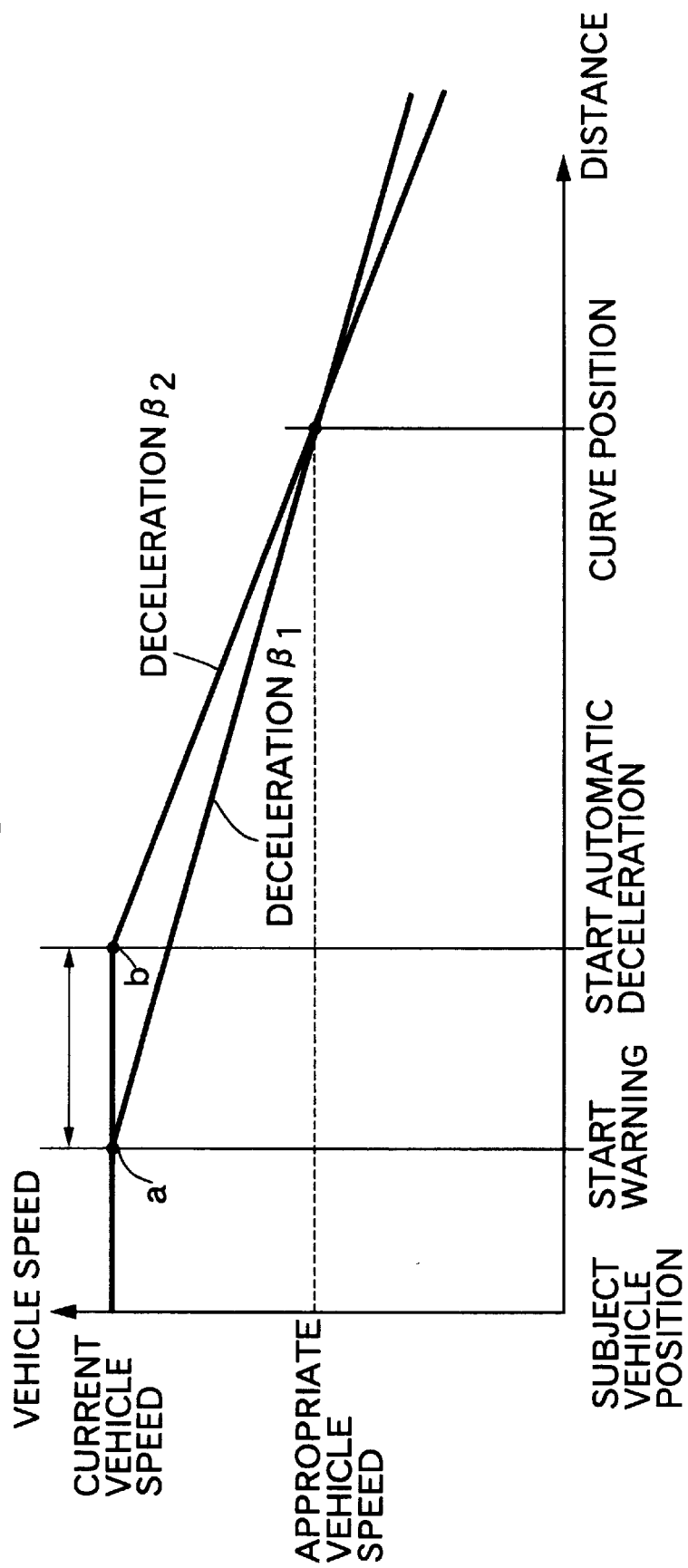

In the second technique, when the vehicle is moved at an excessive speed when approaching a curve, as shown in FIG. 17, a warning is first emitted at a point a and then automatic vehicle deceleration is started at a point b. The point a is a location where if the deceleration of the vehicle is carried out at a reference deceleration value $\beta_1$ from such point, the vehicle speed is reduced at the curved road section to an appropriate value. The point b is a location where if the deceleration of the vehicle is carried out at a reference deceleration value $\beta_2$ from point b, with $\beta_2$ being greater than $\beta_1$, vehicle speed is reduced at the curve to the appropriate value. In this case, a distance between points a and b is varied depending upon the appropriate vehicle speed, the reference deceleration values $\beta_1$ and $\beta_2$ and vehicle speed at the position of the subject vehicle. However, the time taken until the vehicle passes through the point b after passing through the point a, namely, the time taken until the automatic deceleration is started after emission of the warning, is likewise not constant and hence, a level of inconsistency exists in the way in which the prior system responds to vehicles approaching a curved road section.

Therefore, the first modification of the present invention ensures that the time taken from the emission of a warning to the start of the automatic deceleration of the vehicle is constant in order to prevent any inherent inconsistencies in handling vehicles safely passing through curved road sections. The first modification will be described below.

Figure 13:
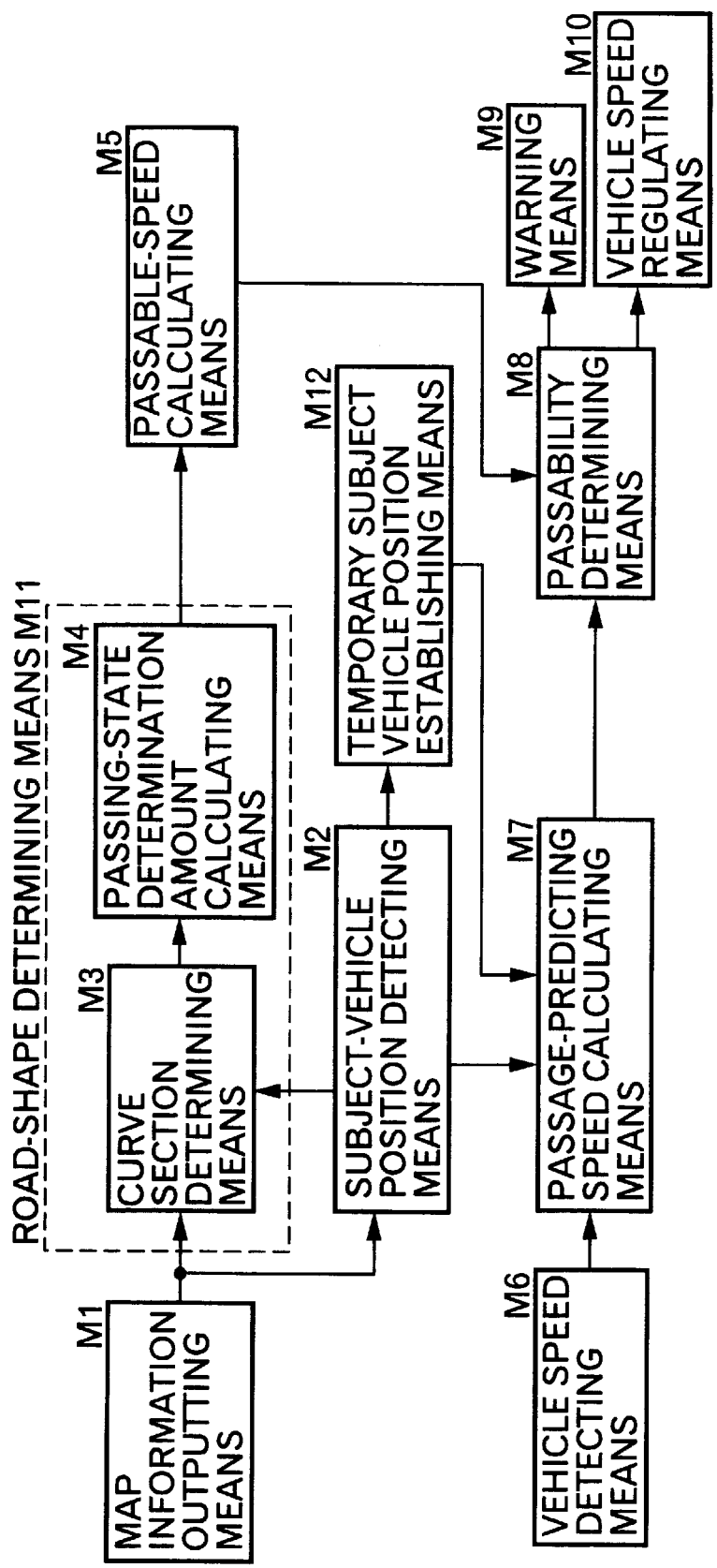

The first modification includes temporary subject vehicle position establishing means M12 being connected between the subject vehicle position detecting means M2 and the passage-predicting speed calculating means M7, as shown in FIG. 13. The temporary subject vehicle position establishing means M12 is means for establishing a temporary position P' (see FIG. 14) of the subject vehicle at a location which the vehicle existing at the subject vehicle position P reaches after a predetermined time $t_0$. Predetermined time period $t_0$ is preferably but not necessarily approximately 1.5 seconds.

Thus, the passage-predicting speed calculating means M7 calculates a passage-predicting speed $V_N$ and a temporary passage-predicting speed $V_N'$ for passage of the vehicle through the node $N_N$, based on the vehicle speed V, the subject vehicle position P or the temporary subject vehicle position P' and a previously set reference deceleration value β for the vehicle. As shown by a solid line in FIG. 14, the passage-predicting speed $V_N$ at each node $N_N$ steadily decreases as a secondary function with an increase in distance from the subject vehicle position P. When it is supposed that the subject vehicle is at the temporary subject vehicle position P', the temporary passage-predicting speed $V_N'$ at each node $N_N$ is decreased as a secondary function, as shown by a dashed line in FIG. 14, but a line drawn by the temporary passage-predicting speed $V_N'$ is displaced in parallel from a line drawn by the passage-predicting speed $V_N$ by a distance corresponding to the predetermined time $t_0$ (1.5 seconds in the embodiment).

The passability determining means M8 compares the temporary passage-predicting speed $V_N'$ with the passable speed $V_{maxN}$. If $V_N' \leq V_{maxN}$, the passability determining means M8 determines that the vehicle can pass through the node $N_N$. If $V_N' > V_{maxN}$, the passability determining means M8 determines that it is difficult for the vehicle to pass through the node $N_N$, and the warning means M9 comprised of a buzzer or a lamp is operated to alert the driver to decelerate the vehicle. Further, the passability determining means M8 compares the passage-predicting speed $V_N$ with the passable speed $V_{maxN}$. If $V_N \leq V_{maxN}$, it is determined that the vehicle can pass through the node $N_N$. If $V_N > V_{maxN}$, it is determined that it is difficult for the vehicle to pass through the node $N_N$, and the vehicle speed regulating means M10 comprised of means for automatically braking the vehicle or means for automatically reducing vehicle engine output is operated to automatically decelerate the vehicle.

The above-described operation will be further described with reference to a flow chart in FIG. 15. The contents of steps S1 to S17 of the flow chart are the same as the contents of steps S1 to S17 of the flow chart shown in FIGS. 4 to 6.

Figure 15:
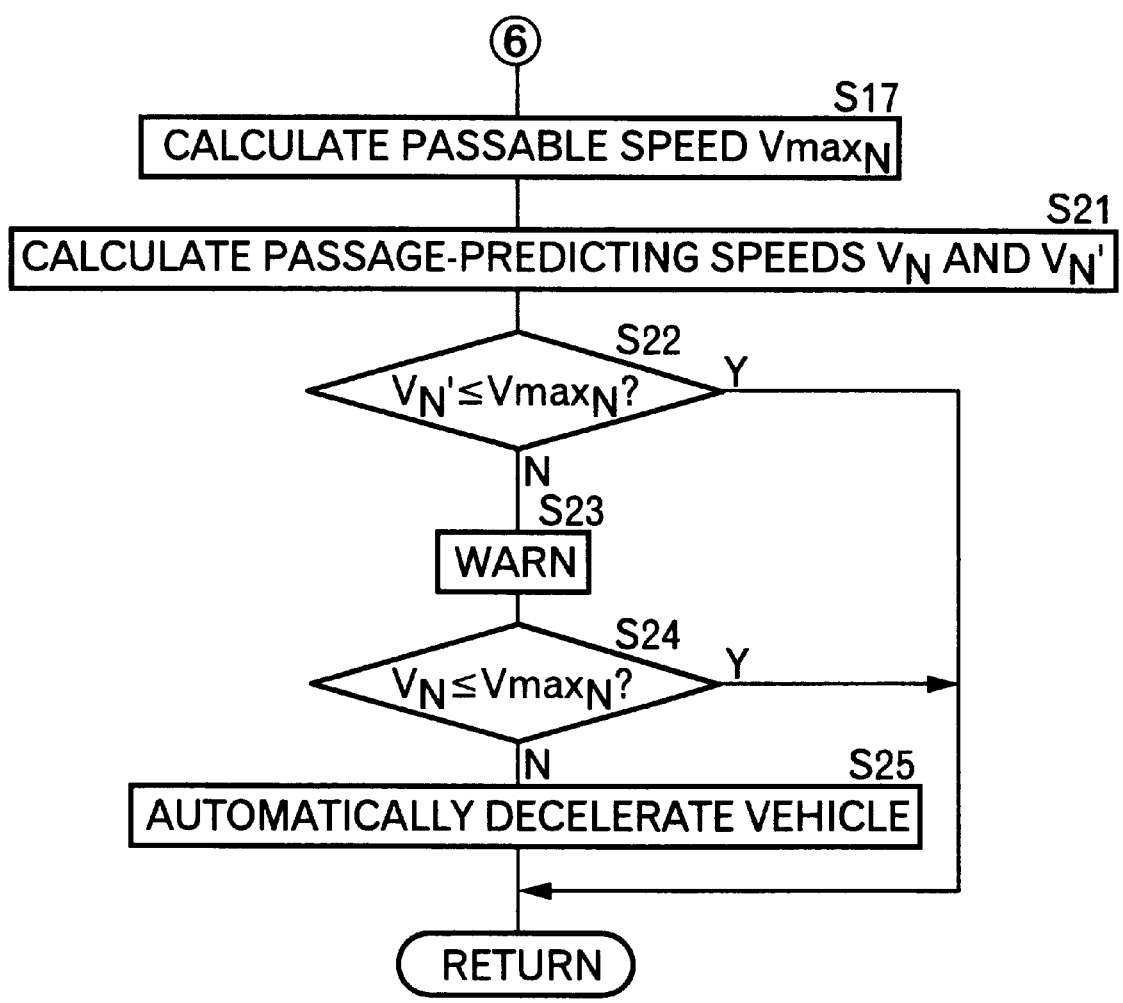

At step S21 of the flow chart in FIG. 15, a passage-predicting speed $V_N$ for passage of the vehicle through the node $N_N$ is calculated assuming that the vehicle has been decelerated at the reference deceleration value $\beta$ from the subject vehicle position P, using equation (12), i.e., $$V_N = (V^2 - 2\beta S_N)^{1/2}$$

A temporary passage-predicting speed $V_N'$ for passage of the vehicle through the node $N_N$ is also calculated at step 21, assuming that the vehicle has been decelerated at the reference deceleration value $\beta$ from the temporary subject vehicle position P', according to the following equation:

$$V_N' = (V^2 - 2\beta S_N')^{1/2} \quad (14)$$

wherein $S_N'$ represents a distance from the temporary subject vehicle position P' to the node $N_N$. At this time, because $S_N$ is greater than $S_N'$, $V_N'$ is greater than $V_N$. Specifically, because the temporary subject vehicle position P' is nearer to the node $N_N$ than the subject vehicle position P, the deceleration is correspondingly retarded, resulting in an increased temporary passage-predicting speed $V_N'$ for passage of the vehicle through the node $N_N$.

At subsequent step S22, the temporary passage-predicting speed $V_N'$ is compared with the passable speed $V_{maxN}$. If $V_N' \leq V_{maxN}$, it is determined that the vehicle can pass through the node $N_N$. If $V_N' > V_{maxN}$, it is determined that it is difficult for the vehicle to pass through the node $N_N$. When it is determined to be difficult for the vehicle to pass through the node $N_N$, the warning means M9 is operated at step S23 to alert the driver to decelerate the vehicle.

When the warning means M9 is operated at step S23, the passage-predicting speed $V_N$ is compared with the passable speed $V_{maxN}$ at step S24. If $V_N \leq V_{maxN}$, it is determined that the vehicle can pass through the node $N_N$. If $V_N > V_{maxN}$, it is determined that it is difficult for the vehicle to pass through the node $N_N$. When it is determined to be difficult for the vehicle to pass through the node $N_N$, the vehicle speed regulating means M10 is operated to automatically decelerate the vehicle at step S25, so that the vehicle can pass through the node $N_N$.

Figure 14:
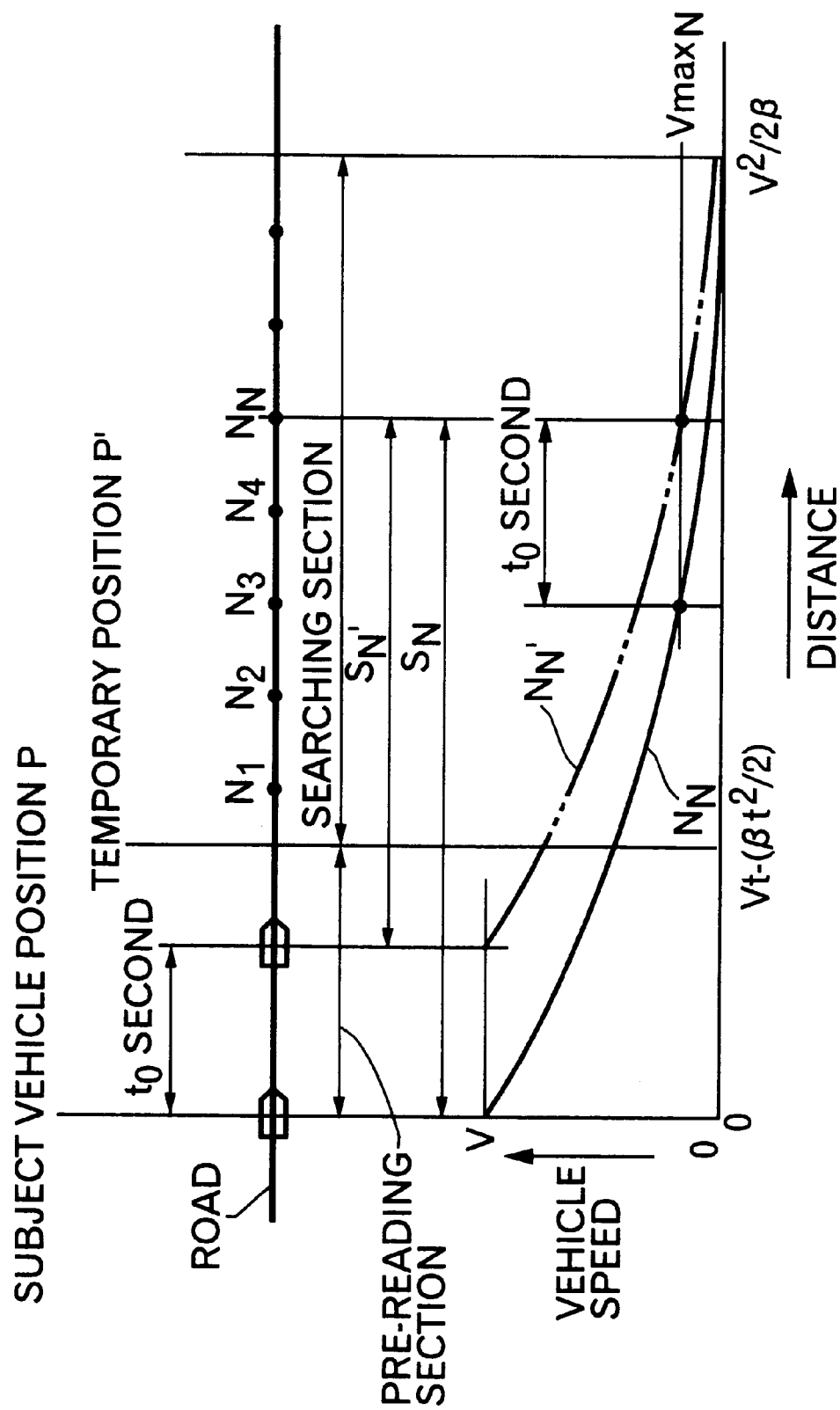

Thus, in determining the timing for activating warning means M9, it is assumed that the vehicle exists at the temporary subject vehicle position P' located ahead of the subject vehicle position P by a distance corresponding to a predetermined time $t_0$, as shown in FIG. 14. Therefore, if the timing for operating warning means M9 and the timing for operating vehicle speed regulating means M10 are determined by comparison of each with the passable speed $V_{maxN}$, the timing for operating warning means M9 precedes the timing for operating vehicle speed regulating means M10 by the predetermined time $t_0$. Thus, the lag of time from the operation of the warning means M9 to the operation of the vehicle speed regulating means M is not varied in accordance with a variation in vehicle speed V, thereby preventing any inconsistencies in system operation.

A second modification to the present invention will be described with reference to FIGS. 18 to 20.

The system described in Japanese Patent Application Laid-open No. 8-147598 calculates a passage-predicting speed for determining whether the vehicle can pass through a curve, based on the assumption that the driver has decelerated the vehicle at a previously set constant deceleration value from the subject vehicle position. The prior system then calculates the passable speed based on the determined shape of a road, and compares the calculated passable speed with the passage-predicting speed in order to determine whether the vehicle can pass through the curve. However, decelerating the vehicle travelling on the curve is more difficult, as compared with the decelerating the vehicle on a straight road. As a result, the deceleration rate actually generated tends to be larger on the straight road and smaller on the curve. Therefore, if it is supposed that the vehicle decelerates at a constant deceleration rate irrespective of the shape of a road, as in the prior art, it is difficult to calculate an appropriate and accurate passage-predicting speed, and there is a possibility that the timing of the activation of the warning and the automatic vehicle deceleration is displaced so as to provide inconsistent operation.

The second modification ensures that both of the warning and the automatic deceleration are carried out at an appropriate time to prevent operational inconsistencies and driver confusion. The second modification will be described below.

Figure 18:
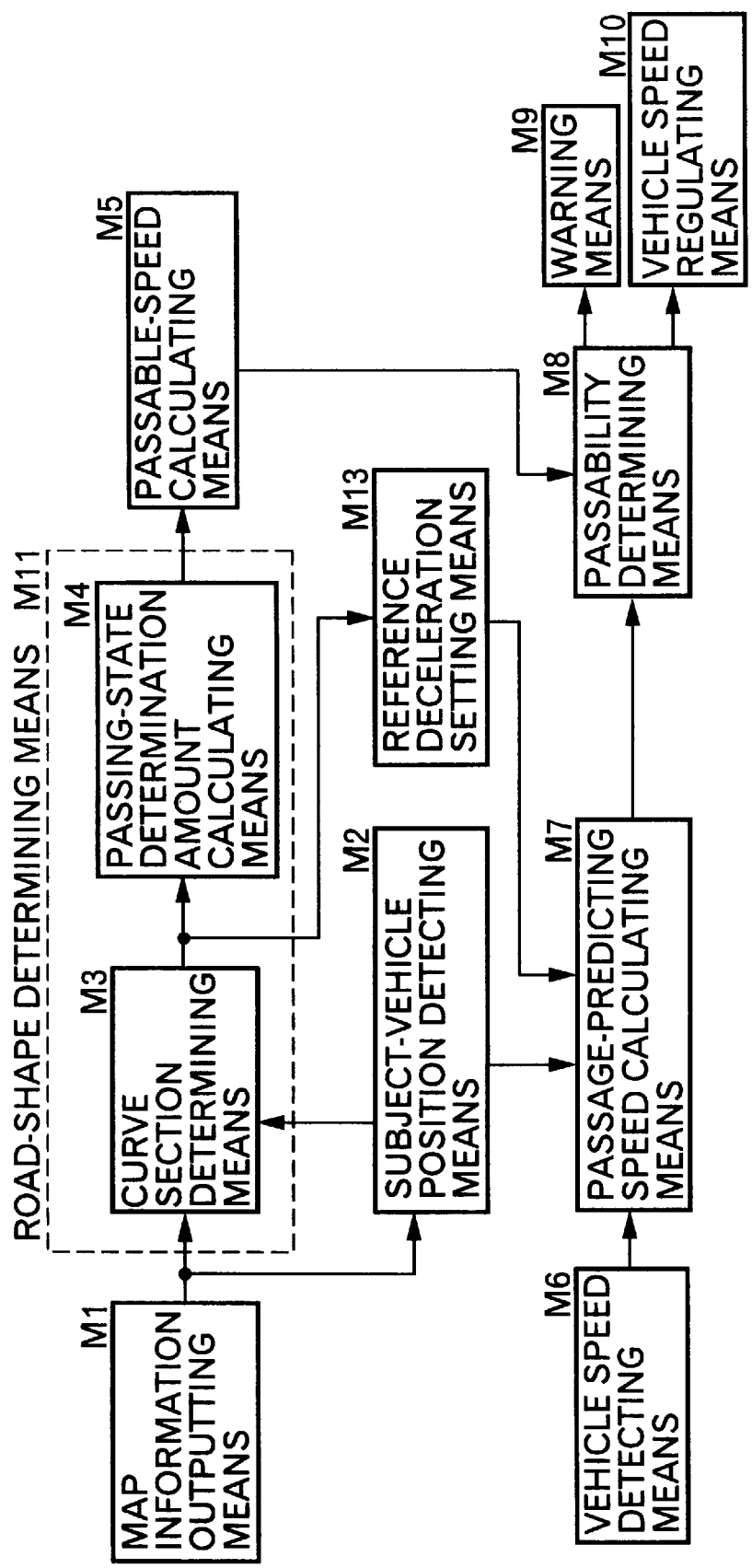

The second modification includes reference deceleration setting means M13 connected between the curve section determining means M3 and the passage-predicting speed calculating means M7, as shown in FIG. 18.

The reference deceleration setting means M13 sets reference deceleration rate or values $\beta_1$ and $\beta_2$ for calculating a passage-predicting speed $V_N$ by the passage-predicting speed calculating means M7. The reference deceleration values $\beta_1$ and $\beta_2$ are deceleration rates presumed to be generated when the driver initiates spontaneous braking at the subject vehicle position P to allow the vehicle to pass through a curve ahead of the vehicle. In a straight road section having a shape determined in the curve section determining means M3, the deceleration is set at a value $\beta_1$ and in a curve section, the deceleration is set at a value $\beta_2$, which is less than $\beta_1$. A lesser deceleration is used for braking on a curved road section because of the increase in braking difficulty when the vehicle is travelling on a curved section, relative to the vehicle travelling on a straight road section.

The operation of the reference deceleration setting means M13 will be further described with reference to a flow chart in FIG. 19. The contents of steps S1 to S17 in this flow chart are the same as the contents of the steps S1 to S17 in the flow chart shown in FIGS. 4 to 6.

Figure 19:
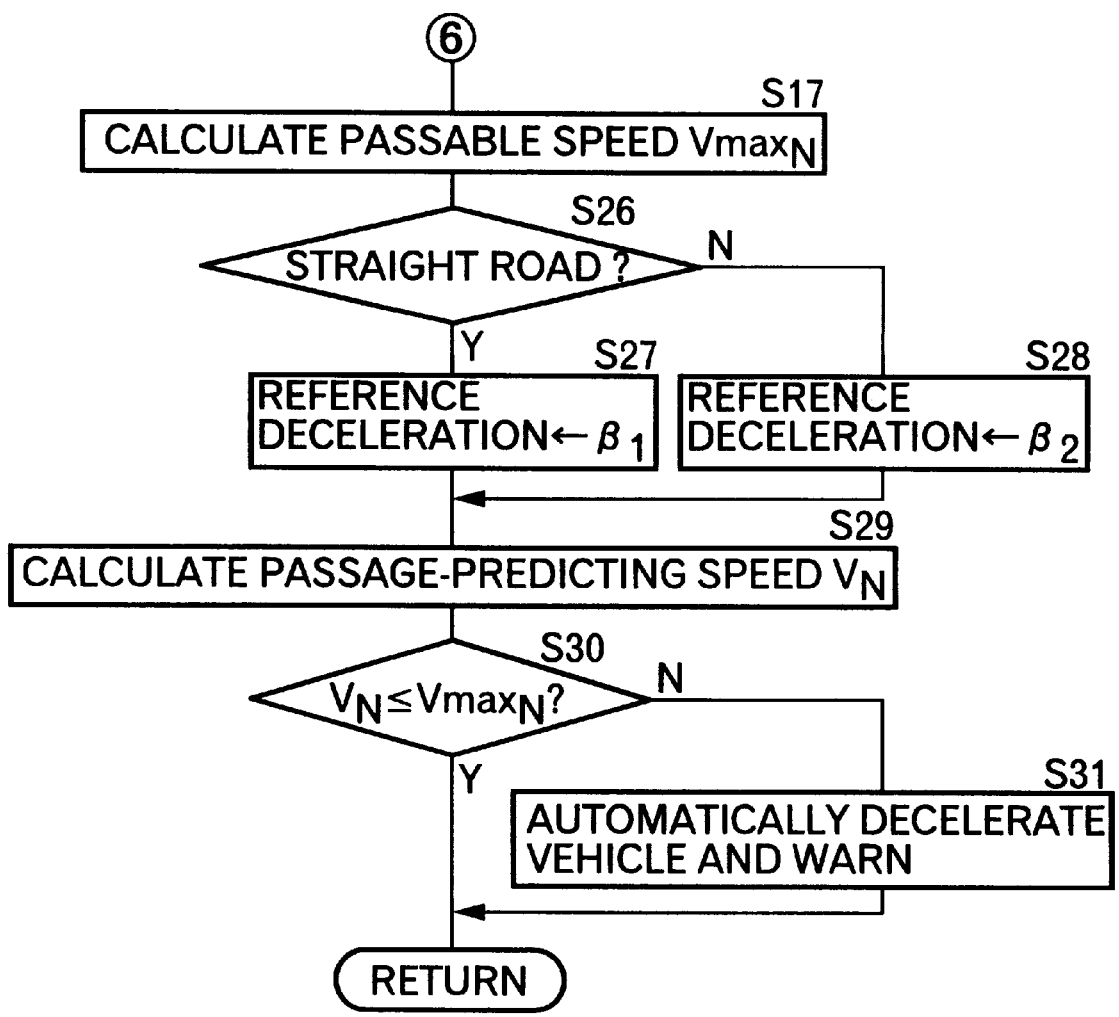

At step S17 in the flow chart shown in FIG. 19, a passage-predicting speed $V_N$ is calculated according to $V_N = (V^2 - 2\beta S_N)^{1/2}$ and then the road shape determining means M11 determines a road section ahead of the subject vehicle position as being either a straight road section or a curve section at step S26. Following such determination, the reference deceleration setting means M13 sets the reference deceleration value $\beta_1$ for the straight road section at step S27, and sets the reference deceleration value $\beta_2$ for the curve section at step S28. At step S29, a passage-predicting speed $V_N$ for passage of the vehicle through the node $N_N$ is calculated based on the set reference deceleration value $\beta_1$ or $\beta_2$.

Figure 20:
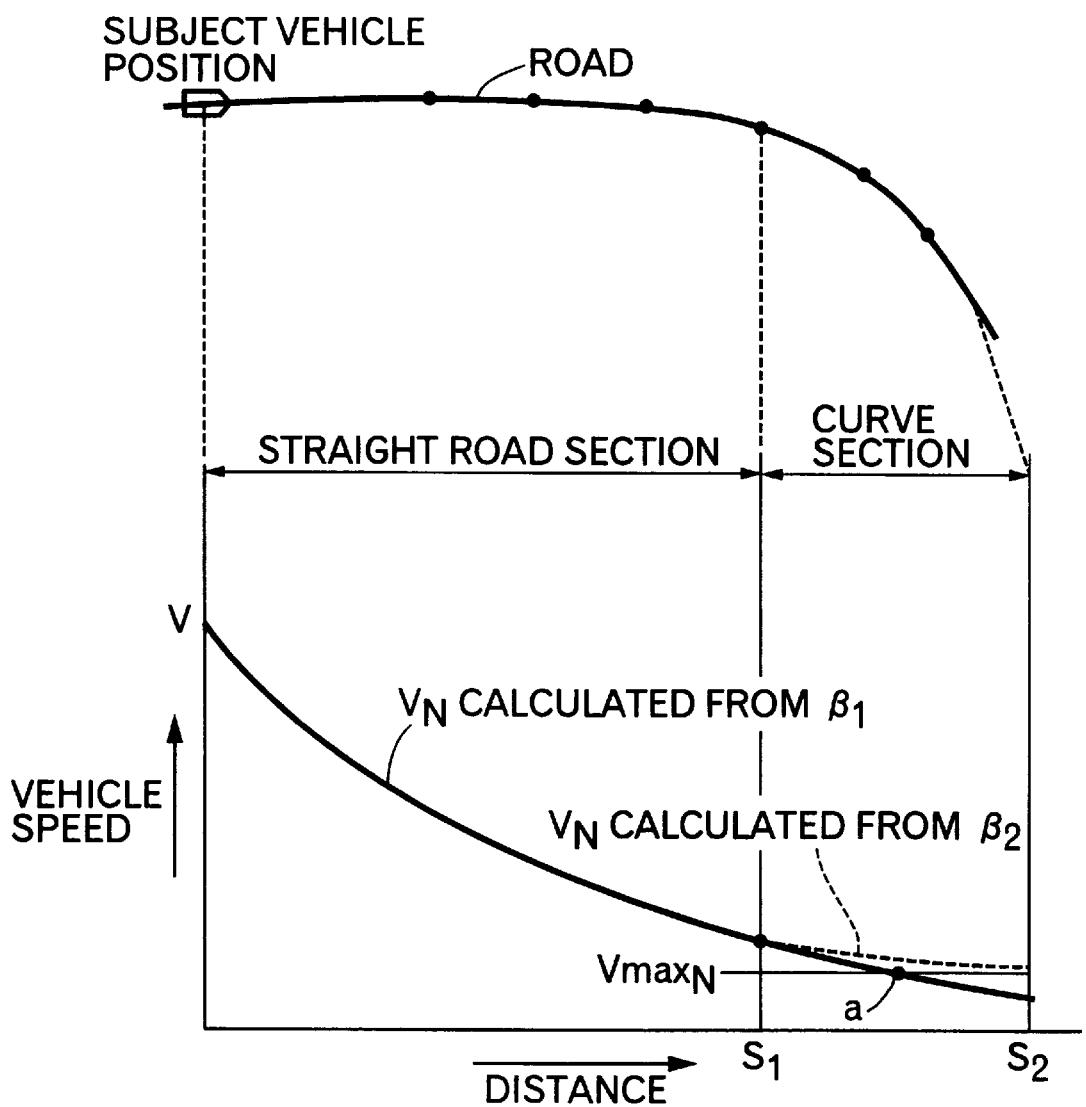

For example, on a road having a straight road portion and a curved road portion connected to the straight road portion, as shown in FIG. 20, the larger reference deceleration value $\beta_1$ is assigned to the straight road portion, and the smaller reference deceleration value $\beta_2$ is assigned to the curved road portion. If the vehicle having a speed V at the subject vehicle position P is decelerated at the reference deceleration value $\beta_1$ on the straight road section, a speed $V_1$ of the vehicle at a terminal end of the straight road section is calculated according to the following equation:

$$V_1 = (V^2 - 2\beta_1 S_1)^{1/2} \quad (15)$$

wherein $S_1$ represents a distance from the subject vehicle position P to the terminal end of the straight road section.

Further, if the vehicle is decelerated at the reference deceleration value $\beta_2$ on the curve section, a speed $V_2$ of the vehicle at a terminal end of the curve section is calculated according to the following equation:

$$V_2 = \{V_1^2 - 2\beta_2(S_2 - S_1)\}^{1/2} \quad (16)$$

wherein $S_2$ represents a distance from the subject vehicle position P to the terminal end of the curve section.

Therefore, if the larger reference deceleration value $\beta_1$ for the straight road section is employed on the curve road section in FIG. 20 as is employed in the prior systems, the passage-predicting speed $V_N$ exceeds the passable speed $V_{maxN}$ at a point a, and the warning and/or the automatic deceleration of the vehicle may be activated despite being unnecessary. Conversely, if the smaller reference deceleration value $\beta_2$ is employed on the curve section, the passage-predicting speed $V_N$ (described as a dotted line in FIG. 20) cannot exceed the passable speed $V_{maxN}$, thereby preventing the warning and/or the automatic deceleration from being unnecessarily carried out.

In this manner, even on a road having a straight section and a curve section combined with each other, a passage-predicting speed $V_N$ at any node $N_N$ can be appropriately calculated by using the corresponding reference deceleration values $\beta_1$ and $\beta_2$.

At subsequent step S30, the passage-predicting speed $V_N$ is compared with the passable speed $V_{maxN}$. If $V_N \leq V_{maxN}$, it is determined that the vehicle can pass through the node $N_N$. If $V_N > V_{maxN}$, it is determined that it is difficult for the vehicle to pass through the node $N_N$. When it is difficult for the vehicle to pass through the node $N_N$, the warning means M9 is operated to alert the driver to decelerate the vehicle, while at the same time, the vehicle speed regulating means M10 is operated to automatically decelerate the vehicle, at step S31. This causes the driver's spontaneous braking and the automatic deceleration to be performed to reduce the vehicle speed, so that the vehicle can reliably pass through the curve.

The scope of the invention is indicated by the appended claims, rather than by the foregoing discussion of presently preferred embodiments.

What is claimed is:

1. A system for determining the passability of a vehicle, comprising:

map information outputting means for outputting a map information as an aggregation of a plurality of nodes constituting a road section;

subject-vehicle position detecting means for detecting a position of the subject vehicle on a map;

curve section determining means for determining whether a node ahead of said subject vehicle position exists on a curve section;

passing-state determination amount calculating means for calculating a passing-state determination amount of a node existing on said curve section as a value resulting from division of an amount of variation in azimuth angle of the vehicle by a distance of movement of the vehicle; and passability determining means for determining whether the vehicle can pass through said node existing on said curve section, based on the passing-state determination amount.

2. A system for determining the passability of a vehicle according to claim 1, wherein said amount of variation in azimuth angle of the vehicle is calculated as an angle formed by a line segment connecting adjacent nodes, and said distance of movement of the vehicle is calculated based on a distance between adjacent nodes.

3. A system for determining the passability of a vehicle according to claim 1, further including passable speed calculating means for calculating a passable speed enabling the vehicle to pass said node existing on said curve section, based on the passing-state determination amount, said passable speed calculating means being adapted to calculate said passable speed based on a preset lateral acceleration limit permissible in passage of the vehicle through said node and said passing-state determination amount according to the following equation:

passable speed=(preset limit lateral acceleration/passing-state determination amount)$^{1/2}$.

4. A system for determining the passability of a vehicle according to claim 1, further including passable speed calculating means for calculating a passable speed enabling the vehicle to pass through said node existing on the curve section, based on the passing-state determination amount, said passable speed calculating means being adapted to calculate said passable speed based on a preset yaw rate limit permissible in passage of the vehicle through said node and said passing-state determination amount according to the following equation:

passable speed=preset limit yaw rate/passing-state determination amount.

5. A system for determining the passability of a vehicle, comprising:

map information means for outputting map data as an aggregation of a plurality of nodes constituting a road section;

subject vehicle position detecting means for detecting a position of a vehicle on a map;

road section determining means for determining whether a node ahead of said vehicle exists on a curve section of road;

passable speed calculating means for calculating a passable speed enabling said vehicle to pass through said node ahead of said vehicle;

passage predicting speed calculating means for calculating a speed of said vehicle;

passability determining means for determining whether said vehicle can pass through said node ahead of said vehicle;

means for warning a driver of said vehicle to decelerate said vehicle, based upon said determination of said passability determining means;

means for automatically decelerating said vehicle following activation of said warning means, based upon said determination of said passability determining means;

wherein said passage predicting speed calculating means includes reference deceleration means for assigning one of a plurality of deceleration values for calculation of said passable speed.

6. A system according to claim 5, further including means for establishing a temporary vehicle position forward of said vehicle on said map, wherein said passage predicting speed calculating means calculates a predicted temporary speed for said vehicle based upon said temporary vehicle position established by said establishing means.

7. A system according to claim 6, wherein:

said passability determining means compares said predicted temporary speed with said passable speed.

8. A system according to claim 6, wherein:

said warning means is activated based upon said comparison of said predicted temporary speed with said passable speed.

9. A system according to claim 6, wherein:

said automatic decelerating means is activated based upon said comparison of said predicted temporary speed with said passable speed.

10. A system according to claim 6, wherein:

said passage predicting speed calculating means calculates a predicted speed of said vehicle based upon data from said map information means and subject vehicle position detecting means; and said automatic decelerating means is activated based upon a comparison of said passable speed with said predicted speed of said vehicle.

* * * * *

UNITED STATES PATENT AND TRADEMARK OFFICE
CERTIFICATE OF CORRECTION

PATENT NO.   : 6,169,952 B1                                   Page 1 of 3
DATED        : January 2, 2001
INVENTOR(S)  : Shohei Matsuda, Makoto Otabe, Yuji Sakaki It is certified that error appears in the above-identified patent and that said Letters Patent is hereby corrected as shown below:

Title page,
Item "[56] References Cited", for U.S. Patent Document 5,539,397 change "Asanauma et al." to -- Asanuma et al. --.

Column 1,
Line 21, after "equal" delete the period.

Column 2,
Line 62, change "length $I_N$" to -- length $l_N$ --.

Column 3,
Line 4, change "$K_C$ and $K_S$" to -- kc and ks --.

Column 4,
Line numbered between 36 and 37, change "passibility" to -- passability --;
Line 62, change "length $1_N$" to -- length $l_N$ --.
Line 64, change "length $1_N$" to -- length $l_N$ --.

Column 5,
Line 1, change "length $1_N$" to -- length $l_N$ --;
Line 7, change "calculating $\theta_N/1_N$" to -- calculating $\theta_N/l_N$ --;
Line 8, change "the $\theta_N/1_N$" to -- the $\theta_N/l_N$ --;
Line 9, change "$\phi_{REF}$" to -- $\Psi_{REF}$ --;
Line 10, change "$\theta_N/1_N \leq \phi_{REF}$" to -- $\theta_N/l_N \geq \Psi_{REF}$ --;
Line 11, "The $\theta_N/1_N$" to -- The $\theta_N/l_N$ --;
Line 14, change "$\theta_N/1_N$" to -- $\theta_N/l_N$ --;
Line 15, change "$\theta_N/1_N$" to -- $\theta_N/l_N$ --;
Line 16, change "$\theta_N/1_N < \phi_{REF}$" to -- $\theta_N/l_N < \phi_{REF}$ --;
Line numbered between 22 and 23, change "$\theta_N/1_N < \phi_{REF}$" to -- $\theta_N/l_N < \Psi_{REF}$ --;
Line numbered between 32 and 33, change "$I_N$" to -- $l_N$ --;
Line numbered between 33 and 34, change "$I_{maxN}$ at step S5. If $I_N \leq I_{maxN}$," to -- $l_{maxN}$ at step S5. If $l_N \leq l_{maxN}$, --;
Line numbered between 35 and 36, change "$I_N > I_{maxN}$" to -- $l_N > l_{maxN}$ --;
Line 44, change "length $I_N$" to -- length $l_N$ --;

UNITED STATES PATENT AND TRADEMARK OFFICE
CERTIFICATE OF CORRECTION

PATENT NO. : 6,169,952 B1  
DATED : January 2, 2001  
INVENTOR(S) : Shohei Matsuda, Makoto Otabe, Yuji Sakaki Page 2 of 3

It is certified that error appears in the above-identified patent and that said Letters Patent is hereby corrected as shown below:

Column 5 (continued),
Approximately line 46, (in equation (1)), change "$I_N$" to -- $l_N$ --;
Line 50, change "length $I_N$" to -- length $l_N$ --;
Line 56, change "length $I_N$" to -- length $l_N$ --;
Line 59, change "length $I_N$" to -- length $l_N$ --;
Line 60, change "$I_{Nmax}$" to -- $I_{maxN}$ --;
Approximately line 63, (in equation (2)), change "$I_{maxN}$" to -- $l_{maxN}$ --;
Line 64, change "$I_N \leq I_{maxN}$" to -- $I_N \leq l_{maxN}$ --;
Line 66, change "$I_N \leq I_{maxN}$" to -- $I_N \leq l_{maxN}$ --.

Column 6,
Approximately line 10, change "$\theta_K/L_K \leftarrow \theta_K/I_K$" to -- $\theta_K/L_K \leftarrow \theta_K/l_K$   (3) --;
Line 15, (in equation (4)), change "$I_{N-1}$ or a shorter value of $I_{maxN}$" to -- a shorter value of $l_{N-1}$ or $l_{maxN}$ --;
Line 16, change "$I_{maxN}$" to -- $l_{maxN}$ --;
Line 21, change "$\theta_1/I_1$" to -- $\theta_1/l_1$ --;
Lines 22-23, change "$\theta_2/(I_2$ or a shorter value of $I_{max2})$" to -- $\theta_2/($a shorter value of $l_1$ or $l_{max2})$ --;
Line 27, change "$\theta_1/I_1$" to -- $\theta_1/l_1$ --; change "$\theta_2/I_2$" to -- $\theta_2/l_2$ --;
Line 29, change "$\theta_3/(I_2$ or a shorter value of $I_{max3})$" to -- $\theta_3/($a shorter value of $l_2$ or $l_{max3})$ --;
Line 50 (in equation (5)), change "$I_{maxN}$" to -- $l_{maxN}$ --;
Line 53, change "$I_{maxN}S$" to -- $l_{maxN}S$ --;
Approximately Line 56 (in equation (6)), change "$I_{maxN}S$" to -- $l_{maxN}S$ --;
Line 59, change "$I_{maxN}S$" to -- $l_{maxN}S$ --;
Line 67, change "$I_N$" to -- $l_N$ --.

Column 7,
Line 2, change "$I_{maxN}S$" to -- $l_{maxN}S$ --; both occurrences; change "$I_N$" to -- $l_N$ --;
Line 12, change "$I_{maxN}$" to -- $l_{maxN}$ --;
Line 13, change "$I_{maxN+1}$" to -- $l_{maxN+1}$ --;
Line 16, change "$I_N$" to -- $l_N$ --;
Line 17, change "$I_{maxN} + I_{maxN+1} = I_{maxN}S$" to -- $l_{maxN} + l_{maxN+1} = l_{maxN}S$ --;
Line 18, change "$I_N$" to -- $l_N$ --;
Line 19, change "$I_{maxN} + I_{maxN+1} = I_{maxN}S$" to -- $l_{maxN} + l_{maxN+1} = l_{maxN}S$ --;

UNITED STATES PATENT AND TRADEMARK OFFICE
CERTIFICATE OF CORRECTION

PATENT NO. : 6,169,952 B1
DATED : January 2, 2001
INVENTOR(S) : Shohei Matsuda, Makoto Otabe, Yuji Sakaki It is certified that error appears in the above-identified patent and that said Letters Patent is hereby corrected as shown below:

Column 7 (continued),
Line 45, change "$K_C$" to -- kc --;
Line 47, change "$K_C$" to -- kc --;
Approximately line 50 (in equation (7)), change "$K_C$" to -- kc --;
Line 53, change "$K_C$" to -- kc --.

Column 8,
Line 2, change "$K_S$" to -- ks --;
Line 6, change "$K_S$" to -- ks --;
Approximately line 9 (in equation (8)), change "$K_S$" to -- ks --;
Line 13, change "$K_S$" to -- ks --;
Line numbered between 23 and 24, change "$I_N/V$" to -- $l_N/V$ --;
Line numbered between 24 and 25, change "$I_N$" to -- $l_N$ --;
Approximately line 30 (in equation (9)), change "$I_N$" to -- $l_N$ --; at both occurrences.

Column 9,
Line 57, change "vale" to -- value --.

Column 14,
Approximately line 33, change "amount)$^{1/2}$." to -- amount)$^{1/2}$. --.

Signed and Sealed this

Fourth Day of December, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,169,952 B1
DATED         : January 2, 2001
INVENTOR(S)   : Shohei Matsuda, Makoto Otabe, Yuji Sakaki It is certified that error appears in the above-identified patent and that said Letters Patent is hereby corrected as shown below:

Title page,
Item "[56] References Cited", for U.S. Patent Document 5,539,397 change "Asanauma et al." to -- Asanuma et al. --.

Column 1,
Line 21, after "equal" delete the period.

Column 2,
Line 62, change "length $I_N$" to -- length $l_N$ --.

Column 3,
Line 4, change "$K_C$ and $K_S$" to -- kc and ks --.

Column 4,
Line numbered between 36 and 37, change "possibility" to -- passability --;
Line 62, change "length $\mathbf{1}_N$" to -- length $l_N$ --.
Line 64, change "length $\mathbf{1}_N$" to -- length $l_N$ --.

Column 5,
Line 1, change "length $\mathbf{1}_N$" to -- length $l_N$ --;
Line 7, change "calculating $\theta_N/\mathbf{1}_N$" to -- calculating $\theta_N/1_N$ --;
Line 8, change "the $\theta_N/\mathbf{1}_N$" to -- the $\theta_N/1_N$ --;
Line 9, change "$\phi_{REF}$" to -- $\Psi_{REF}$ --;
Line 10, change "$\theta_N/\mathbf{1}_N \leq \phi_{REF}$" to -- $\theta_N/1_N \geq \Psi_{REF}$ --;
Line 11, "The $\theta_N/\mathbf{1}_N$" to -- The $\theta_N/1_N$ --;
Line 14, change "$\theta_N/\mathbf{1}_N$" to -- $\theta_N/1_N$ --;
Line 15, change "$\theta_N/\mathbf{1}_N$" to -- $\theta_N/1_N$ --;
Line 16, change "$\theta_N/\mathbf{1}_N < \phi_{REF}$" to -- $\theta_N/1_N < \psi_{REF}$ --;
Line numbered between 22 and 23, change "$\theta_N/\mathbf{1}_N < \phi_{REF}$" to -- $\theta_N/1_N < \Psi_{REF}$ --;
Line numbered between 32 and 33, change "$I_N$" to -- $l_N$ --;
Line numbered between 33 and 34, change "$I_{maxN}$ at step S5. If $I_N \leq 1_{maxN}$," to -- $l_{maxN}$ at step S5. If $1_N \leq l_{maxN}$, --;
Line numbered between 35 and 36, change "$I_N > I_{maxN}$" to -- $l_N > l_{maxN}$ --;
Line 44, change "length $I_N$" to -- length $l_N$ --;

UNITED STATES PATENT AND TRADEMARK OFFICE
CERTIFICATE OF CORRECTION

PATENT NO. : 6,169,952 B1
DATED : January 2, 2001
INVENTOR(S) : Shohei Matsuda, Makoto Otabe, Yuji Sakaki It is certified that error appears in the above-identified patent and that said Letters Patent is hereby corrected as shown below:

Column 5 (continued),
Approximately line 46,(in equation (1)), change "$I_N$" to -- $l_N$ --;
Line 50, change "length $I_N$" to -- length $l_N$ --;
Line 56, change "length $I_N$" to -- length $l_N$ --;
Line 59, change "length $I_N$" to -- length $l_N$ --;
Line 60, change "$I_{Nmax}$" to -- $l_{maxN}$ --;
Approximately line 63,(in equation (2)), change "$I_{maxN}$" to -- $l_{maxN}$ --;
Line 64, change "$I_N \leq I_{maxN}$" to -- $l_N \leq l_{maxN}$ --;
Line 66, change "$I_N \leq I_{maxN}$" to -- $l_N \leq l_{maxN}$ --.

Column 6,
Approximately line 10, change "$\theta_K/L_K \leftarrow \theta_K/I_K$" to -- $\theta_K/L_K \leftarrow \theta_K/l_K$  (3) --;
Line 15, (in equation (4)), change "$I_{N-1}$ or a shorter value of $I_{maxN}$" to -- a shorter value of $l_{N-1}$ or $l_{maxN}$ --;
Line 16, change "$I_{maxN}$" to -- $l_{maxN}$ --;
Line 21, change "$\theta_1/I_1$" to -- $\theta_1/l_1$ --;
Lines 22-23, change "$\theta_2/(I_2$ or a shorter value of $I_{max2})$" to -- $\theta_2/($a shorter value of $l_1$ or $l_{max2})$ --;
Line 27, change "$\theta_1/I_1$" to -- $\theta_1/l_1$ --; change "$\theta_2/I_2$" to -- $\theta_2/l_2$ --;
Line 29, change "$\theta_3/(I_2$ or a shorter value of $I_{max3})$" to -- $\theta_3/($a shorter value of $l_2$ or $l_{max3})$ --;
Line 50 (in equation (5)), change "$I_{maxN}$" to -- $l_{maxN}$ --;
Line 53, change "$I_{maxN}S$" to -- $l_{maxN}S$ --;
Approximately Line 56 (in equation (6)), change "$I_{maxN}S$" to -- $l_{maxN}S$ --;
Line 59, change "$I_{maxN}S$" to -- $l_{maxN}S$ --;
Line 67, change "$I_N$" to -- $l_N$ --.

Column 7,
Line 2, change "$I_{maxN}S$" to -- $l_{maxN}S$ --; both occurrences; change "$I_N$" to -- $l_N$ --;
Line 12, change "$I_{maxN}$" to -- $l_{maxN}$ --;
Line 13, change "$I_{maxN+1}$" to -- $l_{maxN+1}$ --;
Line 16, change "$I_N$" to -- $l_N$ --;
Line 17, change "$I_{maxN} + I_{maxN+1} = I_{maxN}S$" to -- $l_{maxN} + l_{maxN+1} = l_{maxN}S$ --;
Line 18, change "$I_N$" to -- $l_N$ --;
Line 19, change "$I_{maxN} + I_{maxN+1} = I_{maxN}S$" to -- $l_{maxN} + l_{maxN+1} = l_{maxN}S$ --;

UNITED STATES PATENT AND TRADEMARK OFFICE
CERTIFICATE OF CORRECTION

PATENT NO.    : 6,169,952 B1
DATED         : January 2, 2001
INVENTOR(S)   : Shohei Matsuda, Makoto Otabe, Yuji Sakaki It is certified that error appears in the above-identified patent and that said Letters Patent is hereby corrected as shown below:

Column 7 (continued),
Line 45, change "$K_C$" to -- $kc$ --;
Line 47, change "$K_C$" to -- $kc$ --;
Approximately line 50 (in equation (7)), change "$K_C$" to -- $kc$ --;
Line 53, change "$K_C$" to -- $kc$ --.

Column 8,
Line 2, change "$K_S$" to -- $ks$ --;
Line 6, change "$K_S$" to -- $ks$ --;
Approximately line 9 (in equation (8)), change "$K_S$" to -- $ks$ --;
Line 13, change "$K_S$" to -- $ks$ --;
Line numbered between 23 and 24, change "$I_N/V$" to -- $l_N/V$ --;
Line numbered between 24 and 25, change "$I_N$" to -- $l_N$ --;
Approximately line 30 (in equation (9)), change "$I_N$" to -- $l_N$ --; at both occurrences.

Column 9,
Line 57, change "vale" to -- value --.

Column 14,
Approximately line 33, change "amount)$^{1/2}$." to -- amount)$^{1/2}$. --.

This certificate supersedes certificate of correction issued December 4, 2001.

Signed and Sealed this

Twenty-third Day of July, 2002

*Attest:*

JAMES E. ROGAN
*Attesting Officer*   *Director of the United States Patent and Trademark Office*